United States Patent
Kisielewski et al.

(10) Patent No.: US 9,382,125 B2
(45) Date of Patent: Jul. 5, 2016

(54) PRODUCTION OF CRYSTALLINE SODIUM BICARBONATE USING $CO_2$ RECOVERED FROM ANOTHER ALKALI PRODUCTION PROCESS

(71) Applicant: SOLVAY CHEMICALS, INC., Houston, TX (US)

(72) Inventors: James C. Kisielewski, Green River, WY (US); David M. Hansen, Green River, WY (US)

(73) Assignee: SOLVAY CHEMICALS, INC., Houston, TX (US)

(*) Notice: Subject to any disclaimer, the term of this patent is extended or adjusted under 35 U.S.C. 154(b) by 0 days.

(21) Appl. No.: 14/576,844

(22) Filed: Dec. 19, 2014

(65) Prior Publication Data

US 2015/0175434 A1    Jun. 25, 2015

Related U.S. Application Data

(60) Provisional application No. 61/918,860, filed on Dec. 20, 2013.

(51) Int. Cl.
*C01D 5/14* (2006.01)
*C01D 7/10* (2006.01)

(52) U.S. Cl.
CPC ... *C01D 5/14* (2013.01); *C01D 7/10* (2013.01)

(58) Field of Classification Search
CPC .................................. C01D 7/10; C01D 5/14
See application file for complete search history.

(56) References Cited

U.S. PATENT DOCUMENTS

| | | | |
|---|---|---|---|
| 1,937,944 A | 12/1933 | Butler | |
| 2,080,528 A | 5/1937 | Bowman et al. | |
| 2,245,697 A | 6/1941 | Melendy | |
| 2,719,075 A | 9/1955 | Allen | |
| 8,337,571 B2 | 12/2012 | Phillip et al. | |
| 8,366,793 B2 | 2/2013 | Kisielewski et al. | |
| 2009/0291038 A1 | 11/2009 | Davoine et al. | |
| 2011/0274599 A1* | 11/2011 | Hughes ................... | C01D 5/16 423/184 |
| 2013/0156662 A1 | 6/2013 | Walravens et al. | |
| 2013/0156663 A1 | 6/2013 | Walravens et al. | |

FOREIGN PATENT DOCUMENTS

| | | |
|---|---|---|
| FR | 2534571 A1 | 4/1984 |
| WO | WO 2011/138005 A1 | 11/2011 |
| WO | WO 2012/164072 A1 | 12/2012 |

\* cited by examiner

*Primary Examiner* — Daniel C McCracken
(74) *Attorney, Agent, or Firm* — Beatrice C. Ortego

(57) ABSTRACT

A process for the joint production of crystalline sodium bicarbonate and another alkali compound, in which the step for producing such alkali compound generates $CO_2$ as a byproduct, at least a portion of which is used as a feed to the sodium bicarbonate production step. The produced alkali compound is preferably crystalline sodium sulfite. The joint production process preferably employs as feedstock one or more sodium carbonate liquors derived from trona ore. A gas feed which contains $CO_2$ byproduct is subjected to a gas treatment which may include water removal and/or compression before it is used to produce sodium bicarbonate crystals from a sodium carbonate liquor. Such gas feed may comprise a reactor offgas exiting a sulfite reactor; a vent gas exiting a feed or surge tank; a decarbonation gas exiting a decarbonation unit; a vent gas vented from a crystallizer heater; or combinations of two or more thereof.

20 Claims, 7 Drawing Sheets

PRODUCTION OF CRYSTALLINE SODIUM BICARBONATE USING $CO_2$ RECOVERED FROM ANOTHER ALKALI PRODUCTION PROCESS

CROSS-REFERENCE TO RELATED APPLICATIONS

This application claims priority benefit to U.S. provisional application No. 61/918,860 filed Dec. 20, 2013, the entire content of this application being herein incorporated by reference for all purposes.

TECHNICAL FIELD OF THE INVENTION

This invention relates to a process for the joint production of crystalline sodium bicarbonate and another alkali compound, in which the step for producing such alkali compound generates $CO_2$ as a byproduct, at least a portion of which is used as a feed to the sodium bicarbonate production step. In particular, the other alkali product produced in the joint process is crystalline sodium sulfite.

BACKGROUND OF THE INVENTION

Sodium bicarbonate ($NaHCO_3$) is an important alkali product with a wide range of applications including human food, animal feed, flue gas treatment, and chemical industries. The production of sodium bicarbonate is currently almost entirely made by the carbonation of solid or aqueous solutions of sodium carbonate with gaseous $CO_2$ either produced in situ in a soda ash plants or purchased independently.

Sources of sodium carbonate ($Na_2CO_3$) for making sodium bicarbonate may be produced by the Solvay ammonia synthetic process, the ammonium chloride process, and the trona-based processes. Sodium carbonate, also known as soda ash, is one of the largest volume alkali commodities made world wide with a total production in 2008 of 48 million tons. Sodium carbonate finds major use in the glass, chemicals, detergents industries, and also in the sodium bicarbonate production industry.

About 90% of the total U.S. soda ash production ash is produced from trona ore deposits in the Green River Basin in Wyoming. Trona ore is a mineral that contains up to 99% sodium sesquicarbonate ($Na_2CO_3 \cdot NaHCO_3 \cdot 2H_2O$). Trona-based soda ash is obtained from trona ore deposits either by conventional underground mining techniques, by solution mining or lake waters processing. A typical analysis of the trona ore in Green River is as follows:

TABLE 1

| Constituent | Weight Percent |
|---|---|
| $Na_2CO_3$ | 43.4 |
| $NaHCO_3$ | 34.4 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |
| Organics | 0.3 |

The 'monohydrate' commercial process is frequently used to produce soda ash from trona. In the production of soda ash, crushed trona ore is calcined (e.g., heated) to decompose the sodium sesquicarbonate to sodium carbonate.

$2Na_2CO_3 \cdot NaHCO_3 \cdot 2H_2O \rightarrow 3Na_2CO_3 + 5H_2O(g) + CO_2(g)$ The calcination drives off water of crystallization and forms crude soda ash. The calcined ore is dissolved in water or dilute sodium carbonate liquor to give a saturated solution of ~30% $Na_2CO_3$ (depending upon the temperature of the solution) containing insoluble material and impurities originating from trona. The insoluble material is separated from the resulting saturated solution.

According to a preferred soda ash production process termed 'monohydrate process', this clear sodium carbonate-containing solution can be fed to a monohydrate evaporative crystallizer. As this solution is heated, evaporation of water takes place effecting the crystallization of sodium carbonate into sodium carbonate monohydrate crystals ($Na_2CO_3 \cdot H_2O$). The monohydrate crystals are removed from the mother liquor and then dried to convert it to anhydrous soda ash ($Na_2CO_3$). The mother liquor is recycled back through a crystallizer circuit for further processing into sodium carbonate monohydrate crystals. To avoid contamination and deterioration of crystal shape and hardness by impurities and to prevent the buildup of these impurities in the crystallizer, a portion of the crystallizer liquor must be purged. This can result in a loss of up to about 10% of the soda values. The purge liquor includes sodium carbonate as well as impurities, such as organics, sodium bicarbonate, sodium chloride, sodium sulfate, and sodium silicate. This purge liquor typically contains ca. 23-28% sodium carbonate, 1-4% sodium bicarbonate and minor amounts of impurities such as organics, sodium chloride, sodium sulfate, and silicates.

In the production of sodium bicarbonate, the $CO_2$ feedstock can have different origins. The $CO_2$ feed for the sodium bicarbonate production may come from at least one of the following $CO_2$ sources selected from the group consisting of:

1/ from a natural gas plant, after having been concentrated and being carried through a pipeline to the sodium bicarbonate production;

2/ from a gas effluent comprising diluted $CO_2$ which originates from a soda ash plant, for instance from a calciner system used to calcine mechanically-mined trona ore; and 3/ from a vessel (e.g., tank, railcar) comprising purified liquid $CO_2$ (at least 99.5% $CO_2$).

For option 1/, the operators of the natural gas plant must remove $CO_2$ from the natural gas which is then liquefied for transportation via natural gas pipeline. This $CO_2$ source can be used by a sodium bicarbonate producer if the natural gas plant is proximate (for example within 10 miles) to the sodium bicarbonate production but the recovered $CO_2$ must be concentrated (for example through an amine process), and delivering this $CO_2$ source to the sodium bicarbonate production plant typically requires a liquid $CO_2$ pipeline to be constructed. The further apart the natural gas plant and the sodium bicarbonate production plant are from each other, the more expensive in capital expenditures this option becomes. This option also suffers from unplanned/planned downtimes at the natural gas plant when the production of enriched liquid $CO_2$ is stopped.

For option 2/, the soda ash plant may provide a diluted $CO_2$ gas effluent for example from a soda ash calciner system including its boiler stack and/or from a debicarbonation unit in which the content in sodium bicarbonate of a sodium carbonate-containing stream is reduced. This source of $CO_2$ generally requires $CO_2$ enrichment. The enrichment may be carried out by an amine process which involves scrubbing of $CO_2$ from the gas effluent with an amine solvent and steam regeneration of the $CO_2$-loaded amine solvent to recover $CO_2$.

For option 3/, this is by far the most convenient option for highly-pure $CO_2$ source because the sodium bicarbonate production operators do not need to invest in $CO_2$ concentration equipment, but it is also the most expensive option and requires continual delivery by liquid-$CO_2$ trucks or railcars to the plant.

Because the cost of raw material $CO_2$ plays an important part in the economic picture for the entire sodium bicarbonate production plant, there is still a need to further reduce the cost of production for crystalline sodium bicarbonate, without impairing operation conditions of the process.

Sodium sulfite has a variety of commercial uses such as a disinfectant or bleaching (decoloring) agent for fabrics and paper. It is also used as a preservative in food.

Sodium sulfite ($Na_2SO_3$) can be manufactured in a number of ways. Commonly, sodium sulfite is crystallized from a solution of sodium sulfite. Sodium sulfite can be prepared by reacting sulfur dioxide ($SO_2$) in an aqueous, alkaline solution, such as solutions of sodium hydroxide, also known as caustic soda (NaOH), or sodium carbonate ($Na_2CO_3$). Sodium sulfite can react with sulfur dioxide to produce sodium bisulfite. When sodium carbonate is used as a reactant, carbonic acid ($H_2CO_3$) is a by-product of the reaction. The carbonic acid evolves as carbon dioxide ($CO_2$). The sodium sulfite liquor formed by reaction is then fed to a crystallization system, where the sodium sulfite is crystallized. The crystallization system includes a sulfite evaporative crystallizer and a crystallizer heater in a heater circulation loop connected to the sulfite evaporative crystallizer. The sulfite liquor is generally moved by the help of a circulating pump in the heater circulation loop. These sulfite crystals are removed from the crystallizer and dried in a rotary dryer. The $CO_2$ byproduct is generally vented out of the sodium sulfite production process and contributes to greenhouse gas emissions of this plant.

A variety of processes have been disclosed for producing sodium sulfite and address the removal of $CO_2$ byproduct. U.S. Pat. No. 2,245,697 entitled "Manufacture of alkali metal sulfites" discloses a process for making sodium sulfite and teaches that water vapor and air introduced into the reactor as diluent in the $SO_2$ feed is vented out along with $CO_2$ that is present in appreciable amounts under certain acidic reactor conditions. The patent also teaches that the liquor is "gassed" with $SO_2$ feed so that all of the $CO_2$ is "expelled". U.S. Pat. No. 2,080,528 entitled "Process of manufacturing anhydrous sodium sulfite" discloses reacting sodium carbonate with sulfur dioxide to make a sodium sulfite liquor that is then boiled to remove residual $CO_2$ gas. U.S. Pat. No. 2,719,075 entitled "Purification of alkali metal sulfite liquors" discloses introducing air into a sodium bisulfite liquor to remove $CO_2$. U.S. Pat. No. 1,937,944 entitled "Manufacture of sulphites" discloses a process for manufacturing sodium sulfite from sodium carbonate and sulfur dioxide and teaches that the reactor liquor is circulated in the absorbing tower until all the $CO_2$ has "passed off". FR 2534571 entitled "Process and device for production of sodium and potassium sulfite" teaches the use of heat transfer equipment in the consecutive preparation of $Na_2SO_3$, $NaHSO_3$, and $Na_2S_2O_5$.

When $CO_2$ formed in an alkali production process, such as in the sodium sulfite process, is basically a waste stream which contributes to greenhouse gas emissions, it would be advantageous to jointly manufacture such alkali product and crystalline sodium bicarbonate, in which the $CO_2$, liberated as byproduct in gaseous form from the alkali production process, is used as a $CO_2$ source in the production of sodium bicarbonate from sodium carbonate.

SUMMARY OF THE INVENTION

The present invention thus relates to a more cost effective process to produce crystalline sodium bicarbonate. The more cost effective process may be realized, when such process comprises the recovery of $CO_2$ formed as byproduct in another alkali compound production process (such as a sodium sulfite production process) which is preferably proximate to the sodium bicarbonate production plant and the use of this recovered $CO_2$ byproduct as a feed for producing crystalline sodium bicarbonate.

In particular, it is advantageous to modify the process to jointly manufacture a crystalline sodium sulfite from a liquor, in which $CO_2$, liberated as a byproduct in gaseous form from the sodium sulfite liquor before or during sodium sulfite crystallization, is used as a $CO_2$ source in the production of sodium bicarbonate from sodium carbonate.

An embodiment of the present invention related to a process for co-production of at least two crystalline alkali products, one of which being sodium bicarbonate. Such process comprises:

A/ forming a desired crystalline alkali product in an alkali production system from which a gas effluent comprising carbon dioxide ($CO_2$) exits;

B/ treating at least a portion of said gas effluent comprising $CO_2$ to form a treated gas effluent comprising $CO_2$; and C/ reacting at least a portion of said $CO_2$ from said treated gas effluent with sodium carbonate under conversion promoting conditions to produce an aqueous suspension comprising sodium bicarbonate crystals.

In such process, at least a portion of said gas effluent comprising carbon dioxide ($CO_2$) exiting from said alkali production system is generated in step A/ by decarbonating a liquor comprising carbon dioxide ($CO_2$) and said desired alkali product in a vessel to form a decarbonated liquor, said decarbonated liquor being used to form crystals of said alkali product.

The desired alkali product is preferably an alkali metal sulfite.

Another embodiment of the present invention thus related to a process for co-production of crystalline sodium bicarbonate and alkali metal sulfite. An alkali production system used to make the alkali metal sulfite comprises an alkali metal sulfite crystallization system, said alkali metal sulfite crystallization system comprising a sulfite crystallizer, a crystallizer heater in a first circulation loop connected to said sulfite crystallizer, and optionally a filter in an optional second circulation loop connected to said sulfite crystallizer or said crystallizer heater. In such embodiment, the process comprises:

reacting $SO_2$ as one reactant and a carbonate compound as another reactant, under conversion promoting conditions in a sulfite reactor to form the desired alkali metal sulfite product and $CO_2$ to generate a sulfite liquor comprising said desired alkali metal sulfite and at least a portion of the formed $CO_2$, said sulfite liquor having a temperature and a pressure when exiting said reactor; and performing at least one decarbonation technique selected from the group consisting of:

a) passing a stripping gas through said sulfite liquor or a portion thereof to remove at least a portion of said $CO_2$ in order to decrease the $CO_2$ content of said sulfite liquor, so as to form a decarbonated sulfite liquor and a decarbonation gas comprising $CO_2$, wherein said stripping gas excludes sulfur dioxide, said step (a) being carried out prior to loading said sulfite liquor into said sulfite crystallizer, or while passing said sulfite liquor through said first circulation loop, through said optional second circulation loop, or through both;

b) increasing the temperature of said sulfite liquor by 5° F. or more, said step (b) being carried out prior to loading said sulfite liquor into said sulfite crystallizer, or while passing said sulfite liquor through said first circulation loop, through said optional second circulation loop, or through both;

c) decreasing the pressure of said sulfite liquor, said step (c) being carried out prior to loading said sulfite liquor into said metal sulfite crystallizer, or while passing said sulfite liquor through said first circulation loop, through said optional second circulation loop, or through both;

d) venting a condensing side of said crystallizer heater, while passing said sulfite liquor through said first circulation loop; and e) any combination of two or more of these techniques.

The stripping gas in step (a) may comprises steam, air or mixtures thereof; preferably comprises steam, more preferably consists essentially of steam.

The step (b) is carried out to increase the sulfite liquor temperature to a temperature not exceeding the saturation point of said alkali metal sulfite in water.

When the alkali product is a crystalline sulfite salt, step A/ comprises collecting at least one $CO_2$-containing effluent gas stream exiting a sulfite production system selected from the group consisting of:

at least a portion of a reactor offgas exiting a sulfite reactor;

at least a portion of one or more decarbonation vent gases exiting one or more decarbonation units located downstream of a sulfite crystallizer and upstream of a sulfite crystallizer;

at least a portion of a vent gas exiting a surge or feed tank;

at least a portion of a heater vent gas vented from a crystallizer heater which is connected to a sulfite crystallizer in a heater circulation loop;

at least a portion of a heater vent gas vented from a crystallizer heater recirculation loop; and combinations thereof.

The desired alkali product is more preferably sodium sulfite.

Another embodiment of the present invention thus related to a process for co-production of crystalline sodium bicarbonate and sodium sulfite. A sodium sulfite production system used to make the sodium sulfite comprises a sodium sulfite crystallization system, said sodium sulfite crystallization system comprising a sulfite evaporative crystallizer, a crystallizer heater in a first circulation loop connected to said sulfite crystallizer, and optionally a filter in a second circulation loop connected to said sulfite crystallizer or said crystallizer heater. In this embodiments, forming the desired crystalline sodium sulfite product comprises the following steps:

reacting an aqueous solution comprising sodium carbonate with sulfur dioxide in a sodium sulfite reactor under conversion promoting conditions to form a sodium sulfite liquor comprising $CO_2$ and sodium sulfite, and optionally further to form a reactor gas effluent comprising $CO_2$;

introducing the sodium sulfite liquor into a sodium sulfite feed tank;

feeding said sodium sulfite liquor to the sodium sulfite evaporative crystallizer;

circulating said sodium sulfite liquor through said sodium sulfite crystallizer heater in said crystallizer circulation loop;

performing at least one decarbonation technique on at least a portion of said sodium sulfite liquor to become a decarbonated liquor and to form a decarbonation gas stream comprising $CO_2$;

forming sodium sulfite crystals from said decarbonated sodium sulfite liquor into said sulfite evaporative crystallizer; and removing said sodium sulfite crystals from said sulfite evaporative crystallizer, wherein said gas effluent comprising carbon dioxide ($CO_2$) exiting said first production system comprises said decarbonation gas stream comprising $CO_2$, said optionally-generated reactor gas effluent comprising $CO_2$, or combinations of two or more thereof.

The decarbonation technique may be selected from the group consisting of:

a) introducing a stripping gas into the sodium sulfite liquor in the feed tank, and venting carbon dioxide from the feed tank, wherein said stripping gas in step (a) comprises steam, air or mixtures thereof, preferably comprises steam, more preferably consists essentially of steam;

b) heating said sodium sulfite liquor;

c) decreasing the pressure of said sodium sulfite liquor;

d) venting a condensing side of said sulfite crystallizer heater, while passing said sodium sulfite liquor through said crystallizer circulation loop; and e) any combination of two or more of these techniques.

An aqueous solution comprising sodium carbonate is preferably used to make said sodium sulfite liquor. The aqueous solution comprising sodium carbonate may comprise:

an aqueous solution into which trona ore is dissolved;

an aqueous solution into which calcined trona is dissolved;

an aqueous solution into which soda ash is dissolved; or any combination of two or more thereof.

The gas effluent treatment in step B/ preferably comprises compressing at least a portion of said gas effluent to increase its pressure.

Optionally, the gas effluent treatment in step B/ comprises removing water from at least a portion of said gas effluent to reduce its water content.

Since there is generally a maximum allowable water content suitable for compression (based on compressor specifications), water may need to be removed from the gas effluent before compression. If the water content in the $CO_2$-containing effluent to the compressor exceeds the maximum allowable water content based on compressor specifications, then the water removal would be carried out before compression, in order for the gas effluent water content to be equal to or preferably less than the maximum allowable water content suitable for compression. The maximum allowable water content for a feed to a compression unit may be up to 7% or as low as 1% depending on the type of compression unit selected.

In instances, when the gas effluent comprising $CO_2$ exiting the first production system needs to be compressed before step C/ and comprises a water content exceeding the maximum allowable water content suitable for compression (based on compressor specifications), the gas effluent treatment in step B/ further comprises, before the compressing step, removing water from said gas effluent to achieve a water content in a partially-treated (dewatered or dehydrated) gas effluent which is equal to or preferably less than the maximum allowable water content, and then compressing said partially-treated (dewatered or dehydrated) gas effluent to increase its pressure before step C/ is carried out.

In preferred embodiments, the partially-treated or treated gas effluent comprising $CO_2$ should have at most 7 vol. % water, or at most 5 vol. % water, or at most 3 vol. % water, or at most 1 vol. % water.

The optional water removal in said step B/ may comprise:

cooling said gas effluent to condense water;

passing the gas effluent through a desiccant drying unit;

passing said gas effluent through a glycol dehydration unit; or combinations of two or more thereof.

In instances, when the gas effluent comprising $CO_2$ exiting the first production system comprises a water content which does not exceed a maximum allowable water content suitable for compression, such when the gas effluent comprising $CO_2$ contains at most 7 vol. % water, or at most 5 vol. %, or at most 3 vol. %, or at most 1 vol. % water, the gas effluent treatment in step B/ may exclude removing water.

The treated gas effluent comprising $CO_2$ may comprise (on dry basis) at least 90 vol. % $CO_2$, preferably at least 95 vol. % $CO_2$, more preferably at least 97 vol. % $CO_2$, most preferably at least 98.5 vol. % $CO_2$.

To form sodium bicarbonate in step C/, the process preferably uses a solution or stream comprising at least 15 wt. % of sodium carbonate.

Such sodium carbonate solution or stream may comprise:
an aqueous solution or stream into which trona ore is dissolved;
an aqueous solution or stream into which calcined trona is dissolved;
an aqueous solution or stream into which soda ash is dissolved;
an aqueous solution or stream into which an evaporative pond sodium carbonate decahydrate deposit is dissolved;
an evaporative pond bittern aqueous solution or stream;
a recycle stream from a sodium carbonate monohydrate, sodium carbonate decahydrate, or sodium sesquicarbonate crystallizer;
a purge stream from a sodium carbonate monohydrate, sodium carbonate decahydrate, or sodium sesquicarbonate crystallizer;
a mine water solution or stream; or
any combination of two or more thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other methods for carrying out the same purposes of the present invention. It should also be realized by those skilled in the art that such equivalent constructions or methods do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

On the figures, identical numbers correspond to similar references.

Figure 1:
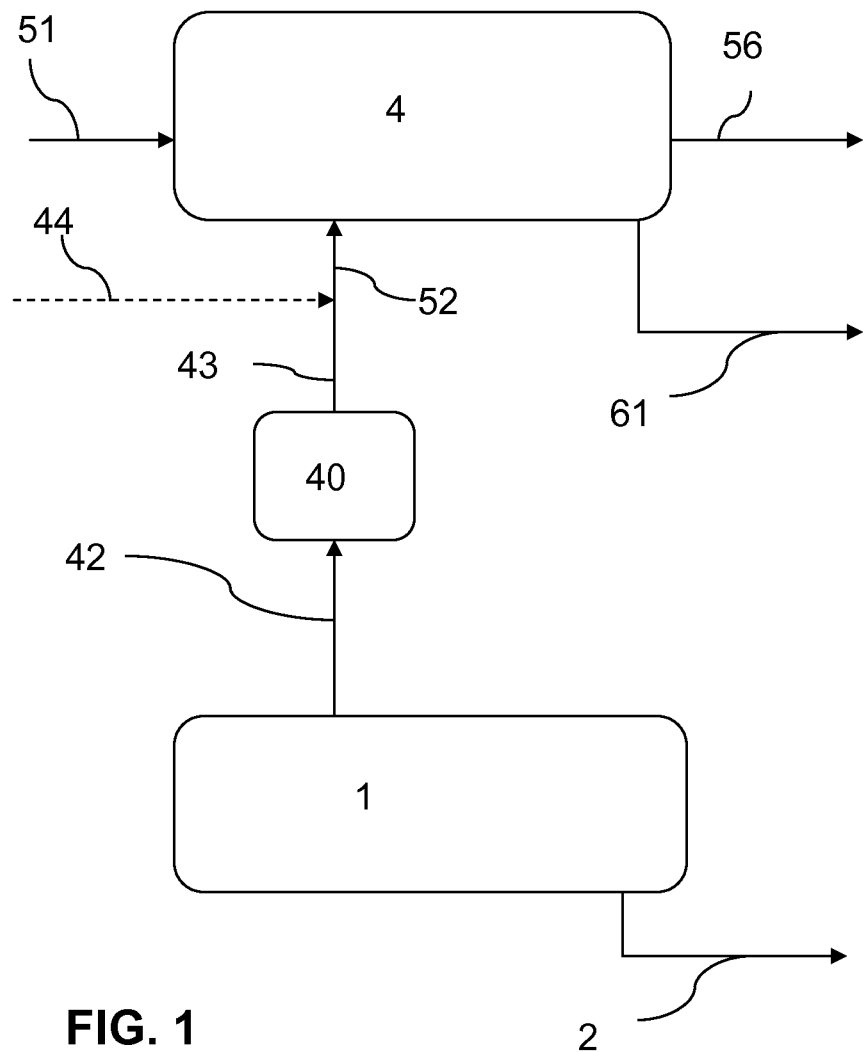
FIG. 1 illustrates a simplified process flow diagram for producing sodium bicarbonate according to a first embodiment of the present invention.

Drawings have are not to scale or proportions. Some features may have been blown out or enhanced in size to illustrate them better.

DEFINITIONS AND NOMENCLATURES

For purposes of the present disclosure, certain terms are intended to have the following meanings.

The term "solution" as used herein refers to a composition which contains at least one solute in a solvent.

The term "slurry" refers to a composition which contains solid particles and a liquid phase.

The term "purge" refers to a stream withdrawn from a part of a process to limit impurity concentration in this process.

The term "solubility" refers to the water solubility of a compound in an aqueous solution.

In the present application, the term "decarbonating" refers to the action of removing $CO_2$ from a liquor.

In the present application, the term "debicarbonating" refers to the action of decreasing the amount of bicarbonate in a stream or liquor by converting sodium bicarbonate to sodium carbonate and $CO_2$.

In the present application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components, or any element or component recited in a list of recited elements or components may be omitted from this list. Further, it should be understood that elements and/or features of a composition, an apparatus, or a method described herein can be combined in a variety of ways without departing from the scope and disclosures of the present teachings, whether explicit or implicit herein.

The use of the singular herein includes the plural (and vice versa) unless specifically stated otherwise.

In addition, if the term "about" or "ca." is used before a quantitative value, the present teachings also include the specific quantitative value itself, unless specifically stated otherwise. As used herein, the term "about" or "ca." refers to a +−10% variation from the nominal value unless specifically stated otherwise.

The phrase 'A and/or B' refers to the following choices: element A; or element B; or combination of A and B (A+B).

The phrase 'A1, A2, . . . and/or An' with n≥3 refers to the following choices: any single element Ai (i=1, 2, . . . n); or any sub-combinations of less than n elements Ai; or combination of all elements Ai.

It should be understood that throughout this specification, when a range is described as being useful, or suitable, or the like, it is intended that any and every amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 1.5" is to be read as indicating each and every possible number along the continuum between about 1 and about 1.5. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

The term 'comprising' includes 'consisting essentially of' and also "consisting of".

Unless otherwise noted, the terms "a" or "an" are to be construed as meaning "at least one of" or 'one or more' and include the plural.

DETAILED DESCRIPTION OF THE PREFERRED EMBODIMENTS

The following detailed description illustrates embodiments of the present invention by way of example and not necessarily by way of limitation.

It should be noted that any feature described with respect to one aspect or one embodiment is interchangeable with another aspect or embodiment unless otherwise stated.

The present invention can be applied in crystallization operations where $CO_2$ is present in the crystallization feed liquor. Particularly, the present invention may be implemented in crystallization systems that use sulfur dioxide in the feed stream and/or that use a carbonate compound as a reactant.

The process according to the invention allows for the joint production of sodium bicarbonate and another alkali product, in particular for the joint production of sodium bicarbonate and an alkali metal sulfite and/or bisulfate, more particularly for the joint production of sodium bicarbonate and sodium sulfite.

According to preferred embodiments of the present invention, the process comprises three main steps:

Step A/: forming a $CO_2$-containing gas effluent from an alkali production process;

Step B/: treating such $CO_2$-containing gas effluent to make it suitable to be used as a feedstock to a sodium bicarbonate production system; and Step C/: forming crystals of sodium bicarbonate in the sodium bicarbonate production system using the treated $CO_2$-containing gas effluent as at least one source of $CO_2$ feedstock.

Step A

Step A/ comprises forming a desired crystalline alkali product in an alkali production system from which a gas effluent comprising carbon dioxide ($CO_2$) exits.

To form the gas effluent comprising $CO_2$ exiting the alkali production system, step A/ preferably includes: decarbonating a liquor comprising carbon dioxide ($CO_2$) and a desired alkali product to form a decarbonated liquor. This decarbonated liquor is preferably used to form crystals of said alkali product.

In preferred embodiments, the alkali product may comprise or consist of an alkali metal sulfite and/or bisulfite, more preferably may comprise or consist of sodium sulfite.

In a brief overview, an alkali metal sulfite liquor (also termed in 'sulfite liquor') comprising said desired alkali metal sulfite and at least a portion of the formed $CO_2$ may be generated by reacting $SO_2$ as one reactant and an alkali metal carbonate compound as another reactant, under conversion promoting conditions in a sulfite reactor to form the desired alkali metal sulfite and carbon dioxide ($CO_2$) as a by-product. The sulfite liquor is then fed to a sulfite crystallization system, which includes a sulfite crystallizer and a crystallizer heater in a heater circulation loop connected to the sulfite crystallizer. The sulfite liquor is generally moved by the help of a circulating pump in a heater circulation loop (first circulation loop).

At least one decarbonation technique may be used to achieve adequate decarbonation of the sulfite liquor before being introduced into the sulfite crystallization system and/or while the sulfite liquor is within the sulfite crystallization system. Two or more decarbonation techniques may be used in combination to achieve adequate decarbonation of the sulfite liquor. The following decarbonation techniques for decarbonating the sulfite liquor may be incorporated, either individually or in any subcombination, in various embodiments of the present invention:

a) passing a stripping gas through the sulfite liquor or a portion thereof to remove at least a portion of said $CO_2$ in order to decrease the $CO_2$ content of the sulfite liquor, so as to form a decarbonated sulfite liquor and a decarbonation gas stream comprising $CO_2$, wherein the stripping gas excludes sulfur dioxide, such step (a) being carried out prior to loading the sulfite liquor into the sulfite crystallizer, or while passing the sulfite liquor through a (first) heater circular loop, through a (second) filter circulation loop, or through both;

b) increasing the temperature of the sulfite liquor by 5° F. or more, said step (b) being carried out prior to loading the sulfite liquor into the sulfite crystallizer, or while passing the sulfite liquor through the first circulation loop, through the second circulation loop, or through both;

c) decreasing the pressure of the sulfite liquor, said step (c) being carried out prior to loading the sulfite liquor into the sulfite crystallizer, or while passing the sulfite liquor through the first circulation loop, through the second circulation loop, or through both;

d) venting a condensing side of the crystallizer heater, while passing the sulfite liquor through the (first) heater circulation loop; or
e) any combination of two or more of these techniques.

The stripping gas in step (a) may comprise a gas selected from the group consisting of air, steam, nitrogen, any inert gas (e.g., argon, neon, . . . ), a light hydrocarbon gas (e.g., methane, ethylene, ethane, propane, or natural gas), and any combination of two or more of these gases thereof. Preferably, the stripping gas may comprise or consist essentially of a gas selected from the group consisting of air, steam, nitrogen, and any combination of two or more of these gases thereof. In some embodiments, the stripping gas may comprise, or may consist essentially of, a gas selected from the group consisting of air, steam, and any combination thereof. In other embodiments, the stripping gas may comprise, or may consist essentially of, a mixture of steam and air. The stripping gas in step (a) more preferably comprises steam, most preferably consists essentially of steam.

Step (b) may be carried out to increase the sulfite liquor temperature to a temperature not exceeding the saturation point of the alkali metal sulfite in water. The increase in the liquor temperature may be at least 5° F. (or 2.8° C.), preferably between about 5° F. and 40° F. (about 2.8-22.2° C.), more preferably between about 10° F. and 30° F. (about 5.5-16.7° C.), and most preferably between about 10° F. and 25° F. (about 5.5-13.9° C.), or alternatively between about 15° F. and 30° F. (about 8.3-16.7° C.). To increase the temperature for decarbonation, the liquor may be subjected to a direct or indirect heat exchange with a hot fluid. Indirect heat transfer may include a heat exchanger in which the liquor and hot fluid are in heat transfer relation but not in fluid communication (such as a shell-and-tube exchanger). The hot fluid may include steam, or any suitable heat transfer medium (e.g., DOWTHERM™ heat transfer fluid, heated air). Direct heat transfer may include a drum or tank or a tower for direct heat exchanger in which the liquor and a hot fluid are in heat transfer relation as well as in fluid communication. When the sulfite liquor may be heated via the hot fluid, the hot fluid may be injected directly into the liquor. The hot fluid in such case may include steam, or any suitable hot or heated gas which is compatible with the equipment material of construction and which is preferably unreactive with the components of the liquor. The hot fluid may comprise or consist of heated nitrogen, air, any inert gas (e.g., argon, neon), or combinations of two or more thereof, preferably may comprise or consist of heated nitrogen, air, or mixtures thereof.

Step (c) may be carried out to decrease the pressure of the liquor so that the partial pressure of $CO_2$ above the liquor is decreased and therefore the $CO_2$ concentration in the liquor is reduced. The decrease in liquor pressure thus flashes out some of $CO_2$, and liberates it in gaseous form. The pressure decrease also serves to shear the liquor through expansion, and, although without wishing to be limited by such theory, it is believed that the spray and droplets that are developed during depressurization provide a large liquid surface area for mass transfer of the dissolved $CO_2$ out of the liquor.

The drop in pressure will vary, but may be as low as 5 psi (or 34.5 kPa), or as high as about 100 psi (or about 690 kPa). The decrease in liquor pressure may be between about 30 psi and about 100 psi (or about 207-690 kPa). Preferable pressure drops may be from 30 to 50 psi (or about 207-345 kPa), or from 50 to 75 psi (or about 345-517 kPa), or from 75 to 100 psi (or about 517-690 kPa). Since, in practice, the pressure of the liquor prior to de-pressurization may be provided with a pump, with typical pump discharge pressures as high as 100 psi, the liquor may be depressurized to atmospheric pressure, in order to provide the most decarbonation benefit.

Step (d) may be carried out to vent a condensing side of a crystallizer heater. The technique of venting the condensing side of the crystallizer heater may be used to control the accumulation of carbon dioxide within the alkali product crystallization system.

When the alkali product is sodium sulfite, the alkali production system comprises a sodium sulfite crystallization system, said sodium sulfite crystallization system comprising a sulfite evaporative crystallizer, a crystallizer heater in a first (heater) circulation loop connected to said sulfite crystallizer, and optionally a filter in a second (filter) circulation loop connected to said sulfite crystallizer or said crystallizer heater.

Forming the desired crystalline sodium sulfite product may comprise the following steps:
reacting an aqueous solution comprising sodium carbonate with sulfur dioxide in a sodium sulfite reactor under conversion promoting conditions to form a sodium sulfite liquor comprising $CO_2$ and sodium sulfite, and optionally further to form a reactor gas effluent comprising $CO_2$;
introducing the sodium sulfite liquor into a sodium sulfite feed tank;
feeding said sodium sulfite liquor to the sodium sulfite evaporative crystallizer;
circulating said sodium sulfite liquor through said sodium sulfite crystallizer heater in said crystallizer circulation loop;
performing at least one decarbonation technique on at least a portion of the sodium sulfite liquor to become a decarbonated liquor and to form a decarbonation gas stream comprising $CO_2$;
forming sodium sulfite crystals from said decarbonated sodium sulfite liquor into said sulfite evaporative crystallizer; and
removing said sodium sulfite crystals from said sulfite evaporative crystallizer,
wherein said gas effluent comprising carbon dioxide ($CO_2$) exiting said first production system comprises said decarbonation gas stream comprising $CO_2$, said optionally-generated reactor gas effluent comprising $CO_2$, or any combination thereof.

The aqueous solution comprising sodium carbonate used to make said sulfite liquor preferably comprises:
an aqueous solution into which trona ore is dissolved;
an aqueous solution into which calcined trona is dissolved;
an aqueous solution into which soda ash is dissolved; or
any combination of two or more thereof.

The aqueous solution comprising sodium carbonate used to make said sulfite liquor preferably comprises at least 15 weight percent of sodium carbonate expressed on dry soluble salts. Advantageously, the aqueous solution comprising sodium carbonate comprises at least 20, more advantageously at least 24 weight percent of sodium carbonate expressed on dry soluble salts.

In such instances, the at least one decarbonation technique may be selected from the group consisting of:
a) introducing a stripping gas into the sodium sulfite liquor in the feed tank, and venting carbon dioxide from the feed tank, wherein said stripping gas in step (a) comprises steam, air or mixtures thereof, preferably comprises steam, more preferably consists essentially of steam;
b) heating said sodium sulfite liquor;
c) decreasing the pressure of said sodium sulfite liquor;

d) venting a condensing side of said sulfite crystallizer heater, while passing said sodium sulfite liquor through said crystallizer circulation loop; and e) any combination of two or more of these techniques.

In particular, the following decarbonation techniques for decarbonating the sodium sulfite liquor may be incorporated, either individually or in any subcombination, in various embodiments of the present invention:

1. direct injecting of a hot gas (e.g., steam) into the sodium sulfite liquor to increase the temperature of the sodium sulfite liquor serving as a feedstock the sodium sulfite crystallizer;
2. preheating the sodium sulfite liquor which is fed to the sodium sulfite crystallizer to increase its temperature while in transit from the sodium sulfite reactor to the sodium sulfite crystallizer;
3. addition of a compressed gas (e.g., air) into transfer piping and venting;
4. direct injecting of a stripping gas (e.g., steam and/or air, preferably steam) into the sodium sulfite liquor via a gas distribution system (e.g., sparger) into a process vessel upstream of the sodium sulfite crystallization system and also preferably downstream of the sodium sulfite reactor which generates the sodium sulfite liquor and venting the sodium sulfite process vessel;
5. letting down the pressure of the sodium sulfite liquor while in transit from the sodium sulfite reactor to the sodium sulfite crystallizer;
6. monitoring the flow rate of the sodium sulfite crystallizer circulation pump by measuring the condensate flow as well as the heater inlet and outlet fluid temperatures;
7. direct injecting of a hot gas (e.g., steam) into the sodium sulfite liquor passing through or exiting the sodium sulfite crystallizer circulation filter loop;
8. venting of the condensing side of the sodium sulfite crystallizer heater.

The gas effluent comprising $CO_2$ exiting the sulfite production system typically comprises one or more decarbonation gas streams which may be obtained from one or more decarbonation techniques, a gas effluent exiting the sulfite reactor, or combination thereof.

For example, the gas effluent comprising $CO_2$ exiting the sulfite production system may comprise a decarbonation gas stream comprising $CO_2$ which exits a decarbonation unit which is separate than the sulfite reactor and the sulfite crystallization system. Such a decarbonation unit may be placed downstream of the sulfite reactor but upstream of the sulfite crystallization system. Such decarbonation unit is preferably a crystallizer feed tank in which the liquor exiting the sulfite reactor is sent to a crystallizer feed tank which serves as a holding vessel for the sulfite liquor before its introduction into the sulfite crystallizer.

For another example, the gas effluent comprising $CO_2$ exiting the sulfite production system may comprise a vent gas comprising $CO_2$ which is vented from the condensing side of the sodium sulfite crystallizer heater.

The gas effluent comprising $CO_2$ exiting the sulfite production system may also comprise a gas effluent comprising $CO_2$ which exits the sulfite reactor.

Finally, the gas effluent comprising $CO_2$ exiting the sulfite production system may comprise any combinations of gas effluents generated within the sulfite production system from the sulfite reactor, from the sulfite crystallizer, and from one or more points in the sulfite crystallizer circulations loop(s).

The gas effluent comprising $CO_2$ exiting the sulfite production system may comprise on a wet basis, at least 50 vol. % $CO_2$, preferably at least 70 vol. % $CO_2$, more preferably of at least 80 vol. % $CO_2$, most preferably from about 83 vol. % $CO_2$ to about 90 vol. % $CO_2$.

The gas effluent comprising $CO_2$ exiting the sulfite production system may comprise at most 30 vol. % water, preferably of at most 20 vol. % water, more preferably of at most 16 vol. % water, most preferably from about 10 vol. % water to about 16 vol. % water.

The gas effluent comprising $CO_2$ exiting the sulfite production system preferably comprises at most 0.5 vol. % $SO_2$ and may comprise up to 0.5 vol. % inerts.

The gas effluent comprising $CO_2$ exiting the sulfite production system may have a temperature ranging from 120° F. to 160° F. (from 48.9° C. to 71.1° C.), preferably from 125° F. to 160° F. (from 51.7° C. to 71.1° C.), more preferably from 130° F. to 155° F. (from 54.4° C. to 68.3° C.), most preferably from 145° F. to 155° F. (from 62.8° C. to 68.3° C.).

The gas effluent comprising $CO_2$ exiting the sulfite production system may have a pressure generally less than 101 kPa, preferably ranging from 11.4 psia to 12 psia (from 78.6 kPa to 82.7 kPa), most preferably about 80 kPa (about 11.6 psia).

Step B

Step B/ comprises treating at least a portion of said gas effluent comprising $CO_2$ (generated in step A/) to form a treated gas effluent comprising $CO_2$.

In preferred embodiments, the gas effluent treatment in step B/ comprises removing water from the gas effluent comprising $CO_2$ exiting the sulfite production system. Such water removal may be performed when such gas effluent comprises more than 1 vol. % water. The water removal for the treatment step B/ should be effective to form a treated gas effluent comprising $CO_2$ with at most 1 vol. % water.

The water removal in said step B/ may comprise:
cooling the gas effluent exiting the sulfite production system to condense water;
passing such gas effluent through a desiccant drying unit;
passing such gas effluent through a glycol dehydration unit; or
any combinations thereof.

In alternate or additional embodiments, the gas effluent treatment in step B/comprises compressing at least a portion of said gas effluent exiting the sulfite production system to increase its pressure. The compression of the gas effluent is generally necessary in order for the treated gas effluent to serve as a suitable feedstock to the sodium bicarbonate production system. The pressure of the gas effluent which is generally sub-atmospheric (<101 kPa) is compressed to be super-atmospheric (>101 kPa, preferably >505 kPa).

In preferred embodiments, the gas effluent treatment in step B/ comprises a two-step process: 1/ removing water from the gas effluent comprising $CO_2$ exiting the sulfite production system to form a partially-treated gas effluent containing at most 1 vol. % water and then compressing said partially-treated gas effluent to increase its pressure to form the treated gas effluent with a higher pressure and containing at most 1 vol. % water. The preferred water removal technique in this instance is water condensation by cooling the gas effluent. The reduced water content of less than 1 vol. % in the resulting treated gas effluent prevents liquid formation in the compression unit.

In general, the treated gas effluent comprising $CO_2$ may comprise at least 90 vol. % $CO_2$, preferably at least 95 vol. % $CO_2$, more preferably at least 97 vol. %, most preferably at least 98.5 vol. % $CO_2$.

The treated gas effluent comprising $CO_2$ preferably comprises at most 1 vol. % water.

The treated gas effluent comprising $CO_2$ preferably comprises at most 0.5 vol. % $SO2$.

For example, the gas effluent, before treatment in step B/, may have a $CO_2$ content from 83 to 89 vol. %, a water content of from 10 to 16 vol. %, from 0 to 0.4 vol. % $SO_2$ and 0.4 to 0.5 vol. % inerts, with a temperature from 125 to 155 of and a pressure of from 11.4 to 12 psia (78.6-82.7 kPa). The gas effluent, after treatment in step B/, may have a $CO_2$ content from 98.5 to 99 vol. %, a water content of from 0.8 to 1.0 vol. %, from 0 to 0.4 vol. % $SO_2$ and 0.4 to 0.5 vol. % inerts, with a temperature from 60 to 70° F. and a pressure of about 112 psia (about 771 kPa).

Step C

Step C/ comprises reacting at least a portion of $CO_2$ from the treated gas effluent (provided by step B/) with sodium carbonate under conversion promoting conditions to produce an aqueous suspension comprising sodium bicarbonate crystals.

Step C/ generally takes place in a sodium bicarbonate reactor.

Step C/ preferably comprises feeding a sodium carbonate-containing stream to the sodium bicarbonate reactor.

The sodium carbonate-containing stream may be any stream made of a solid, a suspension of a solid in an aqueous solution, or an aqueous solution comprising sodium carbonate, and suitable for feeding a sodium bicarbonate crystallizer.

The sodium carbonate solution or stream may comprise:
an aqueous solution or stream into which trona ore is dissolved;
an aqueous solution or stream into which calcined trona is dissolved;
an aqueous solution or stream into which soda ash is dissolved;
an aqueous solution or stream into which an evaporative pond sodium carbonate decahydrate deposit is dissolved;
an evaporative pond bittern aqueous solution or stream;
a recycle stream from a sodium carbonate monohydrate, sodium carbonate decahydrate, or sodium sesquicarbonate crystallizer;
a purge stream from a sodium carbonate monohydrate, sodium carbonate decahydrate, or sodium sesquicarbonate crystallizer;
a mine water solution or stream; or
any combination of two or more thereof.

The sodium carbonate-containing solution may derive partly or totally from trona or nahcolite. Preferably, the sodium carbonate-containing solution derives partly or totally from trona. In the present invention, the trona is generally processed by conventional mining. Advantageously, the trona may be also processed by solution mining, either additionally or alternatively. A typical natural soda ash plant from trona provides a $Na_2CO_3$ feed concentration in the liquor of from 28 to 30% by weight.

The sodium carbonate-containing solution may also derive, in part or in its entirety, from tailings pond solids comprising sodium carbonate.

In a preferred embodiment, the sodium carbonate-containing solution comprises or consists essentially of a purge from a sodium carbonate crystallizer. And in a more preferred embodiment, the sodium carbonate-containing solution comprises or consists essentially of a purge from a sodium carbonate monohydrate crystallizer. In a variant of this most preferred embodiment, the sodium carbonate-containing solution comprises or consists essentially of a purge from a sodium carbonate monohydrate crystallizer in combination with tailings pond solids deriving from sodium carbonate crystallizers purges.

In a recommended embodiment for the process for sodium bicarbonate production according to step C/ in the present invention, the sodium carbonate-containing feed to the sodium bicarbonate reactor contains at least 175 g/kg, preferably at least 190 g/kg, more preferably at least 205 g/kg, most preferably at least 220 g/kg of sodium carbonate. It is however recommended that the purge liquor contains not more than 300 g/kg, preferably not more than 280 g/kg of sodium carbonate.

It is also recommended that the sodium carbonate-containing feed to the sodium bicarbonate reactor contains not more than 35 g/kg, preferably contains not more than 30 g/kg, more preferably contains not more than 25 g/kg, and most preferably contains not more than 20 g/kg of sodium bicarbonate.

In another variant of this most preferred embodiment, the process of the present invention is coupled with the process described in WO2011/138005 with its corresponding US2011274599 (Solvay Chemicals) entitled "Impurities Removal from Waste Solids in the Production of Soda Ash, Sodium Bicarbonate and/or Other Derivatives", incorporated herein by reference. In this case, the process of the present invention further comprises:
depositing a portion of a sodium carbonate monohydrate purge in a tailings pond, wherein part of the remaining sodium carbonate in the tailings pond crystallizes into a solid mass comprising sodium carbonate decahydrate,
recovering at least a portion of such pond deposit and washing it to dissolve some impurities to form a solid leached residue; and
dissolving the solid leached residue to form at least a portion of the sodium carbonate-containing solution used as a feedstock to the sodium bicarbonate production system.

In the process according to the invention, the carbon dioxide must react efficiently with sodium carbonate in a sodium bicarbonate reactor to produce sodium bicarbonate.

To that end, it is recommended to use a well-stirred gas-liquid reactor, comprising a gas injector able to distribute the gas containing $CO_2$ homogeneously into the sodium bicarbonate reactor. The liquid constitutes advantageously the continuous phase inside the reactor, the gas feed being injected at the bottom and moving upwards. The reactor comprises preferably cooling means, to counteract the exothermicity of the reaction of sodium carbonate with $CO_2$.

It is also recommended that the feed gas to the sodium bicarbonate production system comprises at least 50 vol. % $CO_2$, advantageously at least 70 vol. %, preferably at least 80 vol. % $CO_2$, more preferably at least 90 vol. % $CO_2$ or at least 95 vol. % $CO_2$, more preferably at least 97 vol. %, most preferably at least 98.5 vol. % $CO_2$. It is particularly efficient to use substantially pure (>99 vol. %) or pure (100 vol. %) $CO_2$.

The $CO_2$ feed can have different origins. In one recommended embodiment, one of the $CO_2$ sources comes from the treated $CO_2$-containing gas effluent provided in step B/ according to the present invention.

If the amount of $CO_2$ provided by the alkali production system is not sufficient to supply the sodium bicarbonate production system, then a make-up $CO_2$ stream from various other sources may be used.

The make-up $CO_2$ for the sodium bicarbonate production may come from at least one of the following $CO_2$ sources selected from the group consisting of:

1/ from a natural gas plant;

2/ from a gas effluent comprising diluted $CO_2$ which originates from a soda ash plant, for instance from a calciner system used to calcine mechanically-mined trona ore; and 3/ from a cylinder, tank or railcar containing substantially pure liquified $CO_2$ (at least 99.5 vol. % $CO_2$).

The temperature inside the sodium bicarbonate reactor may be between 60 and 85° C., or between 65 and 80° C. The temperature inside the sodium bicarbonate reactor is preferably between 65 and 85° C., more preferably between 70 and 80° C. The temperature of the sodium carbonate liquor when it is introduced into the sodium bicarbonate reactor may be between 65 and 95° C. The temperature of the sodium carbonate liquor is advantageously a little higher (e.g., at least 5° C. higher) than the sodium bicarbonate reactor temperature, preferably between 80 and 95° C.

The operating pressure inside the sodium bicarbonate reactor may be from atmospheric pressure up to 90 psia (from 101 to 9,120 kPa). It is preferable for the operating pressure to be at least slightly above atmospheric pressure, such as between 1.02 and 2 atmospheres (between 15 and 29.4 psia; or between 103 and 203 kPa). The operating pressure is more preferably between 17 psia and 27 psia (between 117 and 186 kPa).

In order to obtain a water suspension comprising enough sodium bicarbonate crystals, it is preferable to maintain a residence time in the sodium bicarbonate reactor greater than 10 minutes, more preferably greater than 20 minutes. Generally, the liquid residence time may be from 60 to 600 min, preferably from 120 to 420 minutes, more preferably from 180 to 360 minutes.

In some embodiments, a crystallization-modifying agent may be added to the sodium carbonate-containing aqueous solution prior to being fed to the sodium bicarbonate reactor or may be added directly to the sodium bicarbonate reactor. When a crystallization-modifying agent is used, it preferably contains Ca and/or Mg.

A suspension comprising sodium bicarbonate crystals is formed in the reactor and is subjected to a separation.

Step C/ may further comprise:
separating sodium bicarbonate crystals from the suspension; and
then drying said separated sodium bicarbonate crystals to form a particulate sodium bicarbonate product.

The separation of the crystals from the suspension can be carried out by any appropriate mechanical separating means, for example by settling, by centrifugation, by filtration, or by any combination of these three separating means.

The separated sodium bicarbonate crystals are finally dried to form the particulate sodium bicarbonate product. The final particulate sodium bicarbonate product may be packed into bags or sacks and/or may be loaded into railcars.

In preferred embodiments of this sodium bicarbonate process, the solution comprising sodium carbonate fed to the sodium bicarbonate reactor comprises preferably at least 175 g/kg of sodium carbonate, and the gas comprising $CO_2$ to the sodium bicarbonate reactor comprises at least 90% $CO_2$.

Additional embodiments for sodium bicarbonate production may be found in the following patent documents which are incorporated herein by reference: US2009/0291038 entitled 'Process for the joint production of sodium carbonate and sodium bicarbonate" (Solvay); US2013/0156662 and US2013/0156663 both entitled 'Process for producing sodium bicarbonate" (Solvay); US2011/274599 entitled 'Impurities removal from waste solids in the production of soda ash, sodium bicarbonate and/or other derivatives" (Solvay Chemicals, Inc); U.S. Pat. No. 8,337,571 entitled 'Removal of impurities in the production of soda ash, sodium bicarbonate and/or other derivatives" (Solvay Chemicals, Inc); and WO2012/164072 entitled "Sodium bicarbonate product with excellent flowability and its method of manufacture" (Solvay Chemicals, Inc).

Various embodiments of the processes according to the present invention will now be described with reference to the drawings.

FIG. 1 illustrates a simplified process flow diagram according to a first embodiment of the present invention, which comprises an alkali production system 1, a sodium bicarbonate production system 4, and a gas treatment unit 40.

The alkali production system 1 forms an alkali product 2 and a gas effluent 42 comprising $CO_2$. The gas effluent 42 is passed through the gas treatment unit 40 to form a treated gas effluent 43.

A sodium carbonate-containing solution 51 and a $CO_2$ feed 52 are fed to the sodium bicarbonate production system 4. Crystalline sodium bicarbonate is generated and exits the system 4 as sodium bicarbonate crystals 61. An aqueous liquor or purge 56 may also exit the sodium bicarbonate production system 4. The $CO_2$ feed 52 preferably comprises at least a portion of the treated gas effluent 43 exiting the gas treatment unit 40.

Optionally the $CO_2$ feed 52 may further comprise a make-up $CO_2$ source 44 when the demand in $CO_2$ for the sodium bicarbonate production system 4 is greater than the amount of $CO_2$ present in the treated gas effluent 43. Even though the gas streams 44, 43 are illustrated as being combined to form a single $CO_2$ feed 52, it is to be understood that each gas stream can be separately fed to the sodium bicarbonate production system 4.

The gas treatment unit 40 may comprise a water removal unit, a compression unit, or both. The gas treatment unit 40 preferably comprises a compression unit and optionally a water removal unit.

Since there is generally a maximum allowable water content for a feed to a compressor based on compressor specifications, water may need to be removed from the gas effluent 42 before compression. If the water content in the $CO_2$-containing effluent 42 fed to the compressor exceeds the maximum allowable water content based on compressor specifications, then the water removal in unit 40 would be carried out before compression in unit 40, in order fir the water content of the treated gas effluent 43 to be equal to or preferably less than the maximum allowable water content suitable for compressor feed. The maximum allowable water content for a compressor feed may be as high as 7% or as low as 1% depending on the type of compressor selected.

When the gas effluent 42 comprising $CO_2$ exiting the alkali production system 1 comprises water, the gas effluent treatment in unit 40 may comprise removing water from said gas effluent in order for said treated gas effluent comprising $CO_2$ to have a lower water content than gas effluent 42, such as a water content of at most 7 vol. % water, preferably at most 5 vol. % water, more preferably 3 vol. % water, or even more preferably at most 1 vol. % water.

If both water removal and compression are used in gas treatment unit 40, it is preferred for the compression unit to be downstream of the water removal unit, in order for the compression unit to receive the 'dewatered or dehydrated' gas effluent exiting the water removal unit.

The water removal unit in gas treatment unit 40 may comprise:
a condenser or a heat-exchanger,
a desiccant drying unit, a glycol dehydration unit, or any combination of two or more thereof.

The water removal unit in gas treatment unit 40 preferably comprises at least a condenser or a heat-exchanger.

The step for gas treatment in gas treatment unit 40 may comprise:

cooling the gas effluent 42 (or a portion thereof) exiting the alkali production system 1 in a condenser or heat-exchanger to condense water;

passing the gas effluent 42 (or a portion thereof) through a desiccant drying unit;

passing the gas effluent 42 (or a portion thereof) through a glycol dehydration unit; or any combinations thereof.

The step for gas treatment in gas treatment unit 40 preferably comprises:

compressing at least a portion of the gas effluent 42 exiting the alkali production system 1 to increase its pressure.

The compression of the gas effluent 42 is generally necessary in order for the treated gas effluent 43 to serve as a suitable feedstock to the sodium bicarbonate production system 4.

The gas treatment in unit 40 may comprise a two-step treatment:

removing water from (at least a portion of) the gas effluent 42 exiting the alkali production system 1 to form a partially-treated gas effluent containing a water content equal to or less than the maximum allowable water content suitable for compression which is carried out in the subsequent step, and then compressing (at least a portion of) said partially-treated gas effluent to increase its pressure to form the treated gas effluent 43 which has a higher pressure than gas effluent 42.

The treated gas effluent 43 comprising $CO_2$ may have a water content of at most 7 vol. % water, or at most 5 vol. %, or at most 3 vol. %, or at most 1 vol. % water.

When the gas effluent 42 exiting the alkali production system 1 has a water content equal to or less than the maximum allowable water content suitable for compression, then it may not be necessary to carry out a water removal step in gas treatment unit 40.

When the gas effluent 42 exiting the alkali production system 1 has a water content greater than the maximum allowable water content suitable for compression, then it is necessary to carry out a water removal step in gas treatment unit 40. The preferred water removal technique in this instance includes at least water condensation by cooling the gas effluent 42. The reduced water content in the resulting treated gas effluent 43 would prevent liquid formation in the compression unit.

Figure 2:
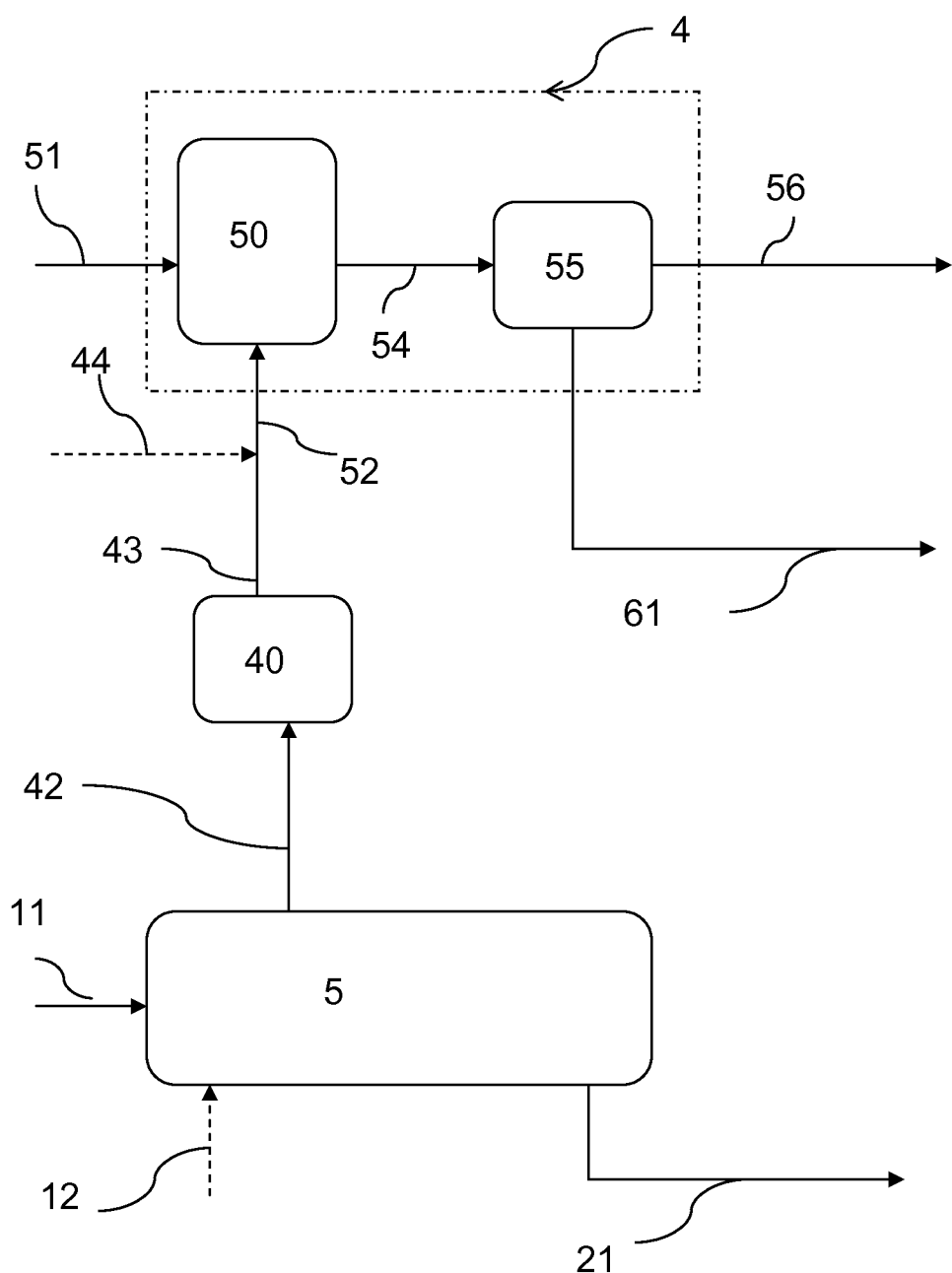
FIG. 2 illustrates a simplified process flow diagram for the joint production of sodium bicarbonate and an alkali compound according to a second embodiment of the present invention, in which the step for producing such alkali compound generates $CO_2$ as a byproduct, at least a portion of which is used as a feed to the sodium bicarbonate production system.

FIG. 2 illustrates a simplified process flow diagram for the joint production of sodium bicarbonate and an alkali metal sulfite according to a second embodiment of the present invention. An alkali metal production system 5 is fed with a sodium carbonate-containing solution 11 and a $SO_2$ feed 12 to generate crystalline alkali metal sulfite exiting the alkali metal production system 5 as crystal slurry 21 and to generate $CO_2$ as a byproduct which exits the alkali metal production system 5 in a gas effluent 42. At least a portion of the gas effluent 42 is used, after being treated in unit 40, as a feed to the sodium bicarbonate production system 4.

The sodium bicarbonate production system 4 comprises a sodium bicarbonate crystallizer 50. Sodium carbonate-containing solution 51 and $CO_2$ feed 52 are fed to the crystallizer 50 in the sodium bicarbonate production system 4. A suspension 54 comprising sodium bicarbonate crystals exits the sodium bicarbonate crystallizer 50 and is fed to a separation unit 55 from which the aqueous liquor 56 and the sodium bicarbonate product 61 are formed.

Figure 3:
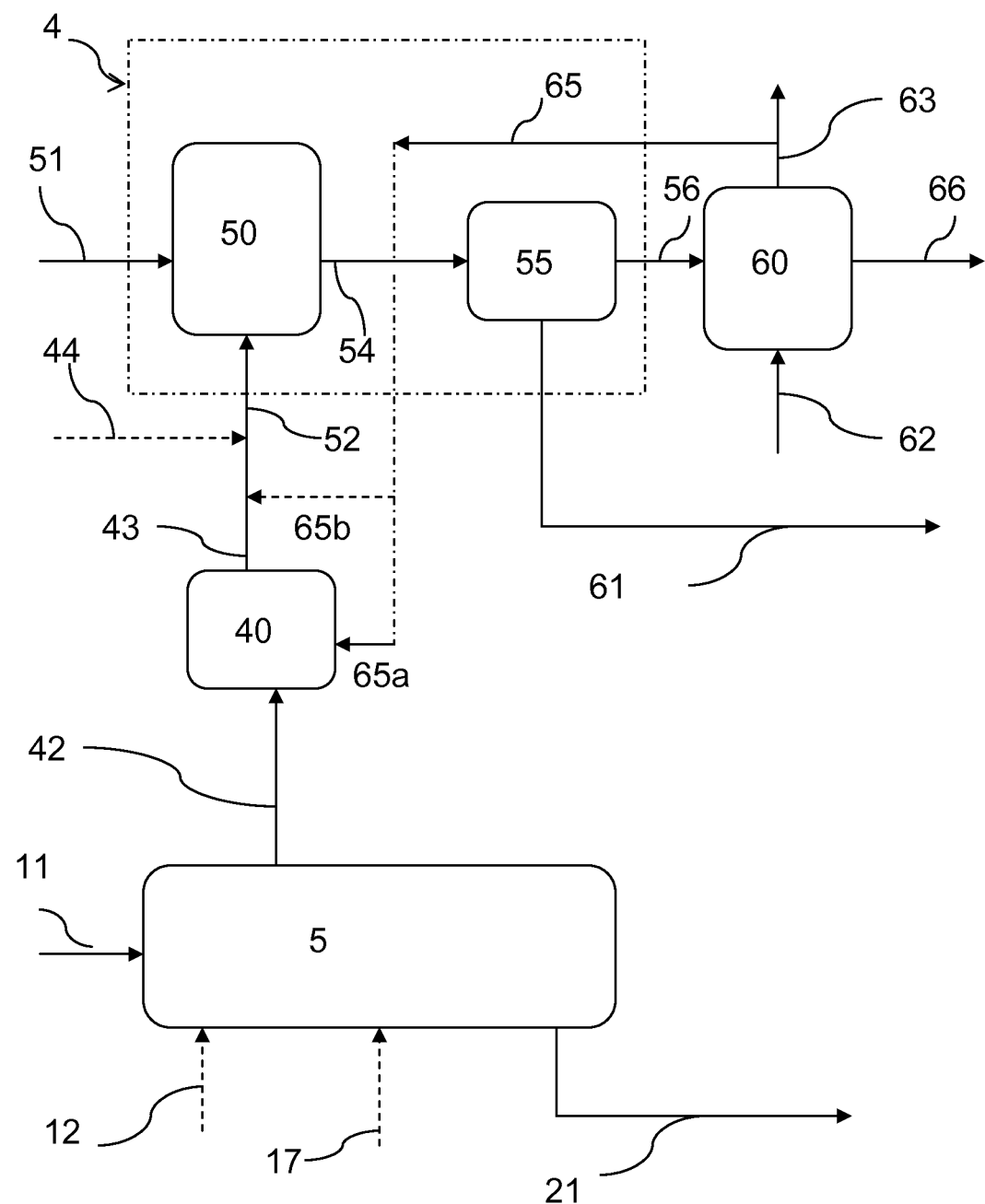
FIG. 3 illustrates a simplified process flow diagram for the joint production of sodium bicarbonate and an alkali compound according to a third embodiment of the present invention, in which the sodium bicarbonate production step uses at least a portion of $CO_2$ generated in the step for producing such alkali compound and further uses a debicarbonation step to recover additional $CO_2$.

FIG. 3 illustrates a simplified process flow diagram for the joint production of sodium bicarbonate and an alkali metal sulfite according to a third embodiment of the present invention, which is similar to FIG. 2, but which further comprises a debicarbonator unit 60 to recover additional $CO_2$. The debicarbonator unit 60 is fed with at least a portion of the liquor 56 containing sodium bicarbonate exiting the separation unit 55.

In the present invention, the debicarbonating of the liquor 56 in debicarbonator unit 60 may be done by any mean known in the art. Generally, debicarbonating is done by chemical calcination using caustic soda to transform part of the sodium bicarbonate of liquor 56 into sodium carbonate, or done by thermal debicarbonation using steam or using a boiler to decompose thermally part of sodium bicarbonate into sodium carbonate, water and $CO_2$. Thermal debicarbonation using steam or a boiler is preferred. The removing of part of the water of liquor 56 may be done in a falling film evaporator, or in a boiler, or in a forced circulation evaporator, or in a forced circulation evaporator crystallizer known in the art. A debicarbonator gas effluent 63 comprising $CO_2$ exits the debicarbonator unit 60.

The $CO_2$ feed 52 entering the sodium bicarbonate crystallizer 50 comprises the treated gas effluent 43 (or at least a portion thereof—not illustrated) and optionally further comprise at least a portion 65 of the debicarbonator gas effluent 63. The $CO_2$ feed 52 may further comprise make-up $CO_2$ source 44 when the demand in $CO_2$ for the sodium bicarbonate production system 4 is greater than what the treated gas effluent 43 and in optional portions (65a and/or 65b) of the debicarbonator gas effluent 63 can supply in $CO_2$.

A portion 65b of the debicarbonator gas effluent 63 may be recycled to the sodium bicarbonate crystallizer 50 in the system 4 'as is', and/or a portion 65a of the debicarbonator gas effluent 63 may be recycled to the sodium bicarbonate crystallizer 50 in the system 4 may be first treated in gas treatment unit 40 before being fed to the sodium bicarbonate crystallizer 50 in the system 10.

Even though the gas streams 44, 43, 65b, 65a are illustrated as being combined to form a single $CO_2$ feed 52, it should be understood that each gas stream can be separately sent to the sodium bicarbonate crystallizer 50 in the system 4 or sub-combinations of any of these streams 44, 43, 65b, 65a can be combined before entry in sodium bicarbonate crystallizer 50.

Figure 4:
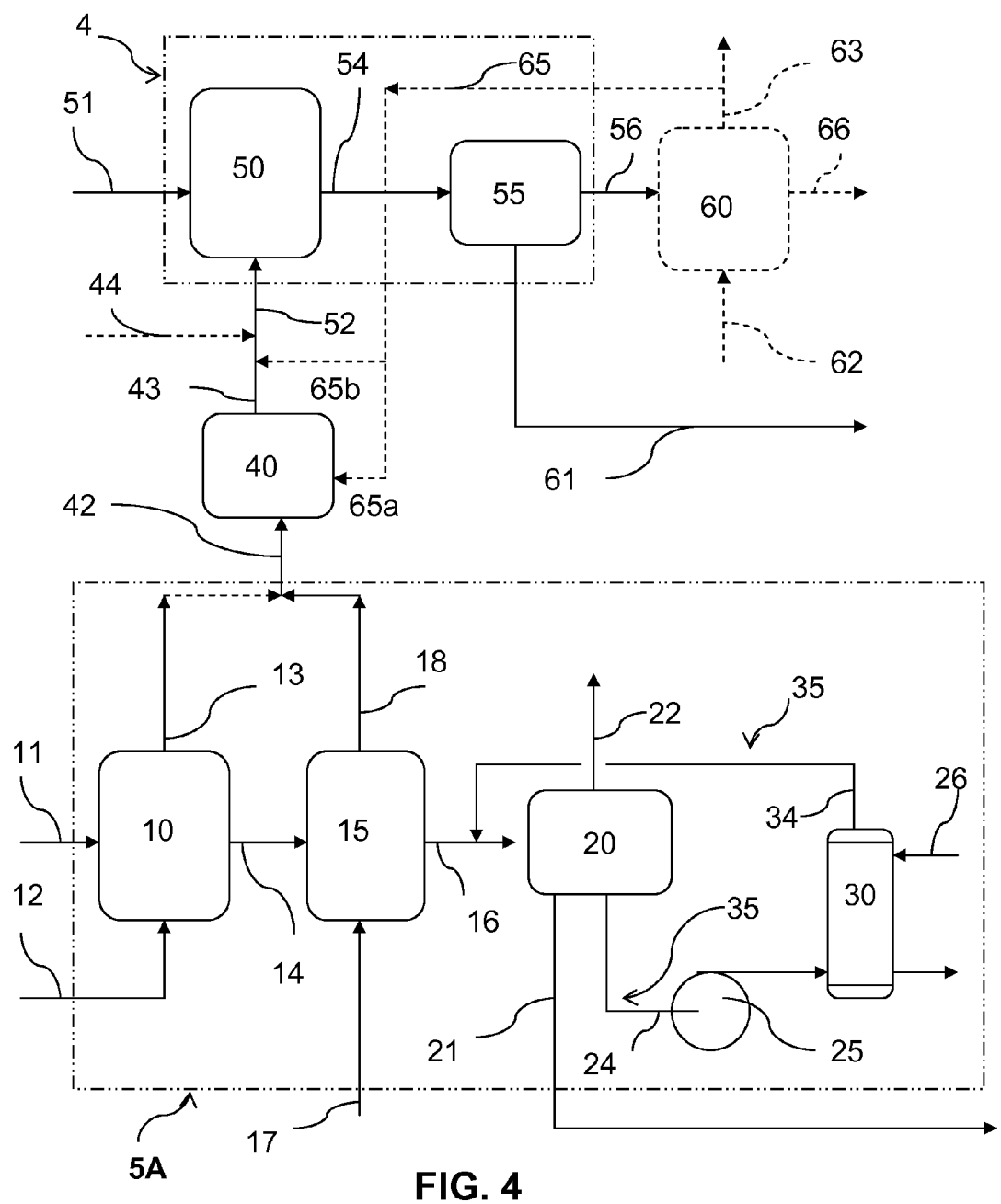
FIG. 4 illustrates a simplified process flow diagram for the joint production of crystalline sodium bicarbonate and sodium sulfite according to a fourth embodiment of the present invention, in which the step for producing sodium sulfite generates $CO_2$ as a byproduct using at least one decarbonation technique prior to the sodium sulfite crystallization step, at least a portion of such $CO_2$ being used as a feed to the sodium bicarbonate production system.

FIG. 4 illustrates a simplified process flow diagram for the joint production of crystalline sodium bicarbonate and sodium sulfite according to a fourth embodiment of the present invention, which comprises a sodium sulfite production system 5A and the sodium bicarbonate production system 4 with gas treatment unit 40 and optional debicarbonator 60 as described previously in FIG. 3.

The sodium sulfite production system 5A comprises a sulfite reactor 10; a crystallization system comprising a sodium sulfite crystallization 20, a crystallizer pump 25 and a crystallizer heater 30; and a feed tank 15 which may serve as a decarbonation unit located downstream of the sulfite reactor 10 and upstream of the sodium sulfite crystallization 20. For that reason, the feed tank 15 may be also termed 'decarbonation unit 15' or 'decarbonation tank 15'. The circulation pump 25 and the crystallizer heater 30 are located in a first circulation loop 35, also known as 'heater circulation loop' or 'crystallizer recirculation loop'.

Sulfite reactor 10 generally has first and second reactant inlets, a liquor outlet, and a gas effluent outlet. In preferred embodiments, the sulfite reactor 10 comprises conversion promoting conditions effective in the manufacture of a sodium sulfite liquor by the reaction of sodium carbonate with sulfur dioxide concurrent with the formation of $CO_2$ as a by-product, so that the sodium sulfite liquor 14 exiting the reactor 10 comprises at least a portion of the formed $CO_2$.

The sulfite crystallizer 20 generally includes a liquor feed inlet connected to line 16, a crystal slurry outlet connected to line 21, and a steam outlet connected to line 22. The sulfite crystallizer 20 may include a liquor circulation loop outlet as shown connected to line 21. The crystallizer 20 may further include a liquor circulation loop return inlet.

The sulfite crystallizer 20 preferably comprises an evaporative crystallizer. The sulfite crystallizer 20 more preferably includes an evaporative crystallizer operated under vacuum. The evaporative crystallizer 20 is operated at a temperature of from 195° F. to 205° F. (about 90.5-96.1° C.), or of from 198° F. to 200° F. (about 92.2-93.3° C.) under a vacuum of from 2 inches Hg to 14 inches Hg (or from 2.8 to 47.4 kPa), or of about 6 inches Hg (or about 20.3 kPa), where the sodium sulfite is crystallized. When the sulfite crystallizer 20 is operated at 6 inches Hg vacuum (or about 20.3 kPa), the crystallizer temperature is generally from 195° F. to 200° F. (or about 90.5-93.3° C.). When the sulfite crystallizer 20 operates under 2 inches Hg vacuum (or about 2.8 kPa), the crystallizer temperature will be near 205° F. (or about 96.1° C.). When the sulfite crystallizer 20 operates under 14 inches Hg (or about 47.4 kPa), the crystallizer temperature will be near 185° F. (or about 85° C.).

The sodium sulfite crystals are removed from the crystallizer 20 via crystal slurry 21 and are dried, typically in a rotary dryer (not shown).

The heater circulation loop 35 is in fluid communication at a first end with the liquor circulation loop outlet of the sulfite crystallizer 20 and at a second end the sulfite crystallizer 20 (e.g., via the liquor circulation loop return inlet, not shown, or via a return line 34 merging into liquor feed line 16, as shown in FIG. 4).

The decarbonation unit 15 may include a vessel configured to receive and vent a stripping gas. The decarbonation vessel may be equipped with a gas distribution system (not shown in FIG. 4 but illustrated for example in units 115 and 125 in FIG. 7). The gas distribution system may comprise a sparger, one or more nozzles, or any combinations thereof, disposed at or near the bottom of the vessel. The gas distribution system provides distribution of the stripping gas to improve its effectiveness in displacing dissolved and/or entrapped $CO_2$ out of the liquor medium (e.g., water). The decarbonation unit 15 generally includes a liquor feed inlet and a liquor outlet. The decarbonation unit 15 may include a sparging gas inlet connected to the gas distribution system, and a vent gas outlet for passing the stripping gas carrying $CO_2$ out of the vessel.

The decarbonation unit 15 may comprise a liquor feed tank, a liquor surge tank, the same vessel as reactor 10; or the crystallizer 20; or may comprise more than one vessel. Alternatively or additionally, the decarbonation unit 15 may comprise a liquor feed pre-heater, such as a heat exchanger configured to increase the temperature of the sulfite liquor. Alternatively or additionally, the decarbonation unit 15 may comprise an expander or a vacuum apparatus configured to decrease the pressure of the sulfite liquor, such as an expansion valve, a barometric condenser, a venturi, a spray nozzle, or any combination of two or more thereof.

The circulating pump 25 in the heater circulation loop 35 pumps the sulfite liquor through the crystallizer heater 30 to transfer the heat needed for evaporation into the sulfite liquor, and is also used to move at least a portion of the sulfite liquor exiting the crystallizer heater 30 back to the crystallizer 20.

The crystallizer heater 30 is preferably a shell-and-tube heat exchanger. The crystallizer heater 30 is in fluid communication with the circulating pump 25, and is adapted to receive at least a portion 24 of the sulfite liquor from the crystallizer 20 to pass through the tubes of the crystallizer heater 30.

The loop 35 is further adapted to return heated sulfite liquor 34 exiting the heater 30 to the crystallizer 20. The crystallizer heater 30 is also adapted to receive steam 26 which condenses as it passes through the crystallizer heater 30 on the shell side, wherein the steam is able to provide some heat necessary to maintain the sulfite liquor temperature with a pre-determined range of values.

A process for manufacturing a crystalline sodium sulfite product from a liquor is carried out in the system 5A illustrated in FIG. 4. This process includes a method for degassing of the sulfite liquor which is carried out in the decarbonation unit 15 before the sulfite liquor is fed to the sulfite crystallization system. These process steps are described as follows.

In a brief overview, a sodium carbonate-containing solution 11 and a sulfur dioxide ($SO_2$) feed 12 are fed to the sulfite reactor 10 under conversion promoting conditions sufficient for the reaction of the two reactants: sodium carbonate and $SO_2$ to take place and form the desired sodium sulfite. The conversion promoting conditions may also be favorable for forming carbon dioxide ($CO_2$) so that a liquor comprising the desired sodium sulfite and at least a portion of the formed $CO_2$ is generated in the reactor 10, and a portion of the reactor liquor exits the sulfite reactor 10 via line 14. $CO_2$ in the sulfite liquor 14 may be in dissolved form, in entrapped gaseous form, or both. A sulfite reactor off-gas 13 may also exit the reactor 10. This off-gas 13 may contain one or both of the two unconverted reactants in gaseous form and/or may contain some of the formed $CO_2$.

The sulfite reactor 10 is typically operated at a temperature from 120° F. to 140° F. (from 48.9 to 60° C.), or at about 160° F. (about 71° C.).

Although $Na_2CO_3$ and $SO_2$ are the major reactants in lines 11 and 12 fed to the sulfite reactor 10, the following sulfite reactions in reactor 10 are believed to occur:

$$SO_2 + Na_2CO_3 + H_2O = NaHSO_3 + NaHCO_3 \quad \text{(Eq. 1)}$$

$$NaHSO_3 + NaHCO_3 = Na_2SO_3 + H_2CO_3 \quad \text{(Eq. 2)}$$

In considering the reaction kinetics, the $H_2CO_3$ term may be treated as a constant, dependent upon the ability of the $H_2CO_3$ to disassociate into $H_2O$ and $CO_2$ to leave the system. An increase in reactor temperature drives the reaction equilibrium of Eq. 2 towards desired product formation. Moving the equilibrium to the right reduces the quantity of sodium bisulfite and sodium bicarbonate present in the liquor and liberates carbon dioxide. Since it has been observed the presence of sodium carbonate and sodium bicarbonate in the sulfite reactor liquor, there is an indication that the reaction may not go to completion. The content of the reactor 10 is usually at a pH of between 7.4 to 7.7, or preferably about 7.6, which is much lower pH than that of pure sodium sulfite solution. At these lower pH values, it is likely that sodium bisulfite is also present in the sulfite reactor liquor.

At least a portion of the liquor so generated by the reaction in the sulfite reactor 10 exits the sulfite reactor 10 via line 14, and is directed to the crystallizer feed tank 15 (also termed decarbonation unit 15).

The reactor liquor 14 exiting sulfite reactor 10 is generally fed to decarbonation unit 15 at a flow rate from 45,000 pounds per hour (lb/hr) to 80,000 lb/hr, or from 20,400 kilograms per hour (kg/hr) to 36,300 kg/hr. The transfer of the reactor liquor 14 to decarbonation unit 15 may be made by overflow or by pump.

The liquor 14 may include sodium sulfite in an amount of from 19 to 26.5 wt. %; or about 24 wt. %; sodium bisulfite in an amount of from 0.1 to 1.1% wt. %; or about 1 wt. %; sodium carbonates in an amount of from 0.1% to 4 wt. %, or about 3 wt. %; and the remaining balance is water in an amount of from 68.5 to 80 wt. %; or about 72 wt. %. The carbonate compounds can exist as carbonate, bicarbonate or carbonic acid depending on the pH of the liquor 14.

The liquor 14 entering the decarbonation unit 15 is then subjected to a method of decarbonation prior to being fed via line 16 to the sulfite crystallizer 20. The decarbonation method is effective in decreasing the $CO_2$ content of the liquor so that the $CO_2$ content of the decarbonated liquor 16 is less than the $CO_2$ content of the liquor 14 entering the decarbonation unit 15.

The decarbonation method may include at least one of the following steps:
a) passing a stripping gas 17 through the liquor disposed in or passing through the decarbonation unit 15 to remove at least a portion of the $CO_2$ dissolved and/or entrapped in this liquor so as to form a vent gas 18 comprising $CO_2$ which exits the decarbonation unit 15;
b) increasing the temperature of the liquor disposed in or passing through the decarbonation unit 15;
c) decreasing the pressure of the liquor disposed in or passing through the decarbonation unit 15; or
any combination of two or more of these techniques thereof.
The increase in temperature in step (b) and the decrease in pressure in step (c) are with respect to the temperature and pressure of the liquor at the exit of the reactor 10. That is to say, the temperature and pressure of the liquor exiting the reactor 10 serve as a basis for the change in pressure or temperature of the liquor during decarbonation.

The decarbonation method should be effective in removing at least 10% of the $CO_2$ from the liquor, preferably at least 25% of the $CO_2$ from the liquor, or at least 50% of the $CO_2$ from the liquor. In some embodiments, more than 80% of the $CO_2$ is removed from the liquor when it is subjected to one or more decarbonation techniques.

Alternatively or additionally, the decarbonation method may be effective in reducing the $CO_2$ content of the liquor by at least 10%, preferably by at least 20%, or by at least 30%, or by at least 50%. In some embodiments, the $CO_2$ content of the liquor is reduced by at least 80% after the liquor has been subjected to one or more decarbonation techniques.

When the decarbonation method in unit 15 comprises stripping the liquor with the stripping gas, the stripping gas acts to displaces at least a portion of the $CO_2$ from the liquor and carries this $CO_2$ portion out of the decarbonation unit.

The stripping gas 17 may comprise a gas selected from the group consisting of air, steam, nitrogen, any inert gas (e.g., argon, neon, . . . ), a light hydrocarbon gas (e.g., methane, ethylene, ethane, propane, or natural gas), and any combination of two or more of these gases thereof. Preferably, the stripping gas 17 may comprise or consist essentially of a gas selected from the group consisting of air, steam, nitrogen, and any combination of two or more of these gases thereof. In some embodiments, the stripping gas 17 may comprise, or may consist essentially of, a gas selected from the group consisting of air, steam, and any combinations thereof. In other embodiments, the stripping gas may comprise, or may consist essentially of, a mixture of steam and air.

The stripping gas 17 may comprise or consist essentially of air ranging in pressure between 60 and 120 psig (about 515-930 kPa); or at about 100 psig (about 791 kPa).

The stripping gas 17 may comprise or consist essentially of steam ranging in pressure between 25 and 75 psig (about 274-618 kPa); or at about 35 psig (about 343 kPa).

More preferably the stripping gas 17 consists essentially of steam. In preferred embodiments, the stripping gas 17 does not include a reactant in gaseous form. For example, in embodiments since the reactant sulfur dioxide ($SO_2$) is fed to the reactor 10 is (via line 12), the stripping gas 17 excludes $SO_2$.

Stripping gas 17 may be injected into the feed tank 15 and sparged through the liquor contained herein, so that carbon dioxide and unreacted $SO_2$ are vented out and exit the tank 15 via line 18.

The tank 15 may be equipped with a gas distribution system (e.g., nozzle)—not illustrated in FIG. 4 but illustrated inside tank 115 in FIG. 6 described later. This gas distribution system is configured to deliver the stripping gas into the liquor disposed inside the tank 15. The gas distribution system is generally disposed below the level of the liquor in the tank 15. The stripping gas 17 would be fed into the tank 15 through such gas distribution system forcing the gas upward through the liquor to finally exit the tank 15 via line 18. The stripping gas displaces some of the carbon dioxide from the liquor inside the unit 15 and the stripping gas carries the displaced carbon dioxide out of the tank 15. For example, steam (e.g., at 35 psig or 343 kPa) or air (e.g., at 100 psig or 791 kPa pressure) may be fed into the tank 15 through a plurality of nozzles or through a sparger forcing the steam or air through the liquor until it exits the tank 15 via line 18 carrying with it the displaced $CO_2$.

The feed tank 15 is generally equipped with a vent connected to line 18 that allows the stripping gas and the liberated carbon dioxide to exit the tank 15 as vent gas 18.

When the stripping gas 17 comprises steam, the condensing steam further heats up the liquor, thus reducing the solubility of carbon dioxide, and liberates more $CO_2$. As non-limiting examples, when steam is used as the stripping gas 17, the flow rate of steam may range from 250 lb/hr and 750 lb/hr (or from 113 kg/hr to 340 kg/hr) to effect an increase in sodium sulfite solution temperature by at least 5° F. (or 2.8° C.); or if a flow rate of about 500 lb/hr of steam (or 227 kg/hr) is used, there is an increase in the sodium sulfite solution temperature of about 10° F. (or 5.6° C.). The increase in liquor temperature in unit 15 is being measured using as the basis, the temperature of the liquor in line 14 exiting reactor 10. Optionally, a stream of air or a gas stream comprising a mixture of air and steam may also be sparged into the feed tank 15.

The minimum pressure of the stripping gas 17 being injected into the liquor contained in the unit 15 should be high enough to overcome the head pressure of the liquid present in the unit 15. For example in a 20-feet (6-meter) tall tank serving as decarbonation unit 15, the minimum pressure of the stripping gas 17 would be 10 psig (about 170 kPa).

The maximum pressure of the stripping gas 17 being injected into the liquid contained in decarbonation unit 15 would be limited by the geometry of the decarbonation vessel used, such that its pressure would be low enough not to force the liquor out of the decarbonation unit.

The degree of decarbonation is influenced in unit 15 by the flowrate of the stripping gas 17. For example in a sodium sulfite process producing 50,000 tons per year, overall stripping gas flowrates may be in the order of 100-500 standard cubic feet per minute (scfm) or 170-850 standard cubic meters per hour with the stripping gas comprising a mixture of steam and air.

When the stripping gas 17 comprises or consists essentially of steam, steam may be at a pressure ranging from 25 psig to 100 psig (about 240 to 790 kPa). For example, in an industrial setting for the manufacture of sodium sulfite for example, steam pressure of from 35 psig to 60 psig (about 340 to 515 kPa) is adequate to meet the minimum/maximum pressure criteria described above.

When the stripping gas 17 comprises or consists essentially of air, the air may be at a pressure ranging from 75 psig to 125 psig (about 615 to 965 kPa), preferably at about 100 psig (about 790 kPa). In industrial plants, compressed air is generally available at near 100 psig (about 790 kPa).

When the decarbonation method in decarbonation unit 15 comprises increasing the temperature of the liquor, increasing the liquor temperature reduces the solubility of $CO_2$, and thus liberates $CO_2$ in gaseous form. Increasing the liquor temperature to a value slightly below or not exceeding the saturation point would provide the maximum decarbonation efficiency.

The increase of the liquor temperature for decarbonation is limited by the boiling point of the water in the liquor. That is to say, if the liquor temperature exceeds the water boiling point, then crystals will begin to form in the decarbonation unit 15, and will begin to foul it. The increase of the liquor temperature for decarbonation is also limited by the content of the desired sodium sulfite in the liquor. Since sodium sulfite is less soluble at higher temperatures, an increase of liquor temperature above the sodium sulfite saturation temperature will produce sodium sulfite crystals in the decarbonation unit 15. As an example, for a sodium sulfite concentration of 25% in the liquor, the saturation temperature is 135° F. (about 57° C.), and thus exceeding 135° F. will result in sodium sulfite crystals formation in the decarbonation unit 15, which is not desirable at this stage of the process. Thus if the sulfite reactor 10 is operated at about 120° F. (about 49° C.), a maximum increase of 15° F. (or 8.3° C.) should be used in decarbonation unit 15 for an effective removal of $CO_2$ from the sulfite liquor while preventing premature crystallization in decarbonation unit 15.

In general, the increase in liquor temperature may be at least 5° F. (or 2.8° C.), preferably between about 5° F. and 40° F. (about 2.8-22.2° C.), more preferably between about 10° F. and 30° F. (about 5.5-16.7° C.), and most preferably between about 10° F. and 25° F. (about 5.5-13.9° C.), or alternatively between about 15° F. and 30° F. (about 8.3-16.7° C.). To increase the temperature in decarbonation unit 15, the liquor may be subjected to a direct or indirect heat exchange with a hot fluid. For example, when the increase in liquor temperature is effected by indirect heat transfer, the decarbonation unit 15 may include a heat exchanger (not illustrated) in which the liquor and hot fluid are in heat transfer relation but not in fluid communication (such as a shell-and-tube exchanger). The hot fluid may include steam, or any suitable heat transfer medium (e.g., DOWTHERM™ heat transfer fluid, heated air).

In other embodiments, when the increase in liquor temperature may be effected by direct heat transfer, the decarbonation unit 15 may include a drum or tank or a tower for direct heat exchanger in which the liquor and a hot fluid are in heat transfer relation as well as in fluid communication.

In such case, the sulfite liquor may be heated via the hot fluid which is injected directly into the liquor. The hot fluid in such case may include steam, or any suitable hot or heated gas which is compatible with the equipment material of construction and which is preferably unreactive with the components of the liquor. The hot fluid may comprise or consist of heated nitrogen, air, any inert gas (e.g., argon, neon), or any combinations thereof, preferably may comprise or consist of heated nitrogen, air, or mixtures thereof.

When the decarbonation method carried out in unit 15 comprises decreasing the pressure of the liquor, the decrease in pressure of the liquor serves to reduce the total pressure above it so that the partial pressure of $CO_2$ above the liquor is decreased and therefore the $CO_2$ concentration in the liquor is reduced. The decrease in liquor pressure thus flashes out some of $CO_2$, and liberates it in gaseous form. The pressure decrease also serves to shear the liquor through expansion, and, although without wishing to be limited by such theory, it is believed that the spray and droplets that are developed during depressurization provide a large liquid surface area for mass transfer of the dissolved $CO_2$ out of the liquor.

The drop in pressure will vary, but may be as low as 5 psi (or 34.5 kPa), or as high as about 100 psi (or about 690 kPa). The decrease in liquor pressure may be between about 30 psi and about 100 psi (or about 207-690 kPa). Preferable pressure drops may be from 30 to 50 psi (or about 207-345 kPa), or from 50 to 75 psi (or about 345-517 kPa), or from 75 to 100 psi (or about 517-690 kPa). Since, in practice, the pressure of the liquor prior to de-pressurization may be provided with a pump, with typical pump discharge pressures as high as 100 psi, the liquor may be depressurized to atmospheric pressure, in order to provide the most decarbonation benefit.

It should be noted that the decarbonation method in unit 15 may be carried out by performing, sequentially or concurrently, more than one of the steps (a), (b) and (c) as described above. For example, the decarbonation in unit 15 may be carried out by simultaneously increasing the temperature of the liquor and stripping the liquor by injecting a hot stripping gas, wherein the temperature of the hot stripping gas is greater than that of the liquor in line 14 entering the decarbonation unit 15. The hot stripping gas may have a temperature at least 5° F. higher (or at least 2.8° C. higher), or at least 10° F. (or at least 5.5° C. higher), than the liquor in line 14 entering the decarbonation unit 15. For example, in a sodium sulfite manufacture process, the hot stripping gas may have a temperature of at least 125° F. (or at least 51.6° C.), when the liquor temperature is about 120° F. (or 48.9° C.) when exiting the reactor 10. The hot stripping gas may have a temperature 50° F. higher or more than the liquor in line 14 entering the decarbonation unit 15. However, the hot stripping gas may have a much higher temperature than the liquor in line 14, so long as the resulting temperature of the heated liquor formed in unit 15 and transferred via line 16 does not exceed the saturation point where crystals begins to form.

In alternate embodiments, the decarbonation method in unit 15 may be carried out by sequentially increasing the temperature of the liquor and then stripping the liquor by injecting a stripping gas, or by sequentially stripping the liquor by injecting a stripping gas and then increasing the temperature of the liquor.

When several decarbonation techniques are carried out, they may be carried out in any order. The several decarbonation techniques may be carried out in one single vessel serving as unit 15 or in a plurality of units 15.

In some embodiments, one of the decarbonation techniques selected from steps (a) to (c) may be carried out multiple times. For example, two or more decarbonation steps via stripping may be carried out by using stripping gases of same composition or different compositions. Such an embodiment will be described later in relation to FIG. 7.

The decarbonated sulfite liquor 16, that is to say which is leaner in $CO_2$ content, exiting the decarbonation unit 15 is thus directed (e.g., pumped or gravity fed) to the sulfite crystallizer 20.

Under suitable operating conditions, water in the liquor is evaporated. At the same time, crystals of the desired alkali product are formed in the crystallizer 20 and are removed from the sulfite crystallizer 20 by withdrawal of a crystal slurry 21. The crystal slurry 21 containing crystals of the desired alkali product can then be sent to a drying unit (e.g., rotary dryer)—not shown—where the crystals can be dried.

If the evaporator crystallizer temperature is higher than that of the liquor 16 feeding the crystallizer 20, then it is likely that more gaseous carbon dioxide would be liberated in the crystallizer 20 as well as in the circulation loop 35.

In embodiments of the process according to the present invention carried in the system illustrated in FIG. 4, various $CO_2$-containing streams exit the sodium sulfite process and any of them, individually or in combinations, may serve to form the $CO_2$-containing effluent gas 42 which is used as a $CO_2$ source in the production of sodium bicarbonate. In FIG. 4, the $CO_2$-containing effluent gas 42 may thus comprise:
  at least a portion of the reactor offgas 13;
  at least a portion of the decarbonation vent gas 18; or
  combinations of these gas streams which comprise $CO_2$.

Even though the gas streams 13, 18 are illustrated as being combined to form a single CO2 feed 42 in FIG. 4, it is to be understood that each gas stream can be separately sent to the gas treatment unit 40.

The present invention also provides alternate or additional decarbonation steps for removing $CO_2$ in one or more circulation loops connected to the sulfite crystallizer 20, and thus preventing the accumulation of $CO_2$ within the various equipment of the crystallization system. These embodiments are illustrated in FIGS. 5 to 7 and described below.

Figure 5:
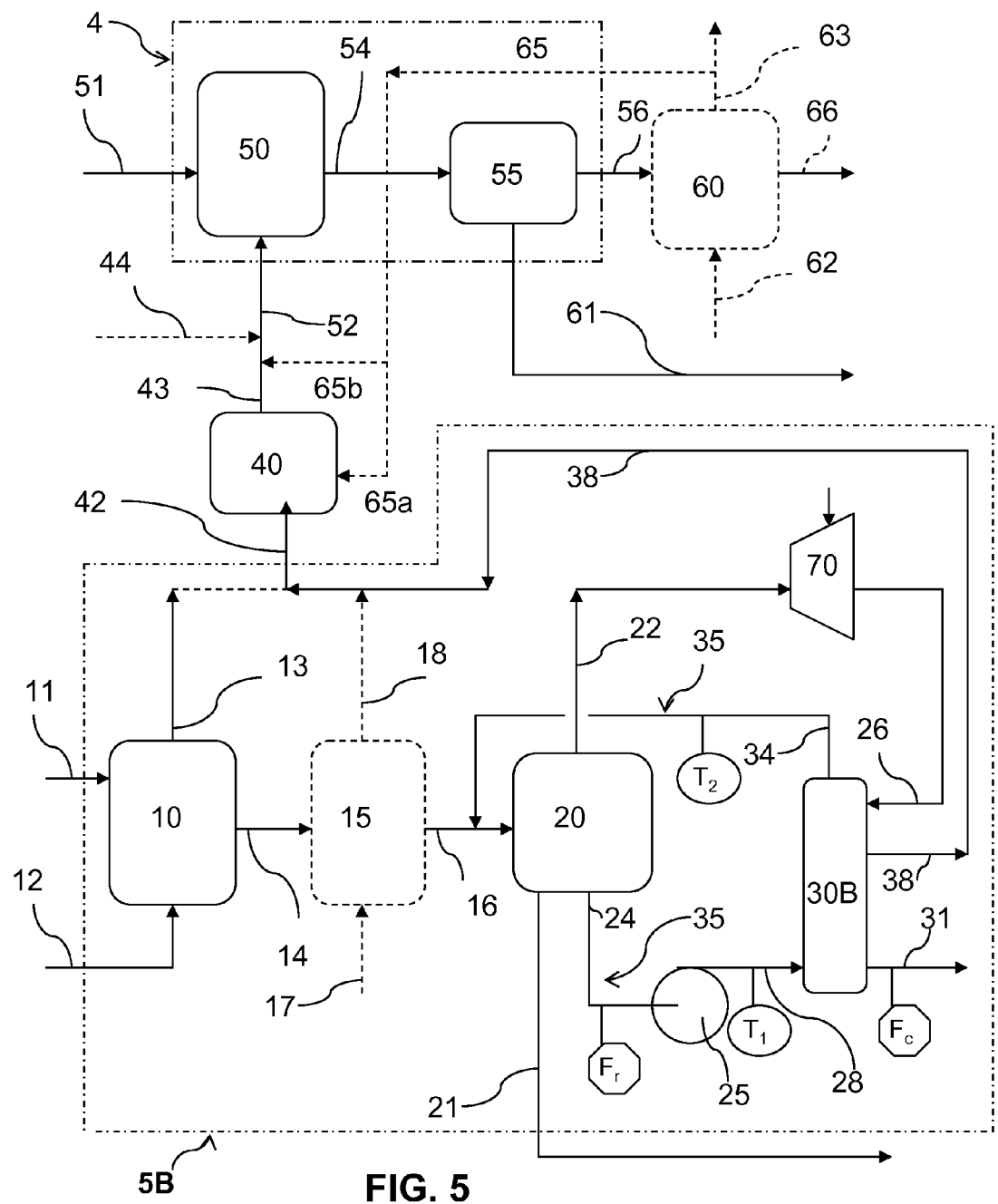
FIG. 5 illustrates a simplified process flow diagram for the joint production of crystalline sodium bicarbonate and sodium sulfite according to a fifth embodiment of the present invention, in which the step for producing sodium sulfite generates $CO_2$ as a byproduct using at least one decarbonation step being carried out in a crystallizer heater circulation loop which is connected to a sodium sulfite crystallizer, at least a portion of such $CO_2$ being used as a feed to the sodium bicarbonate production system.

FIG. 5 illustrates a simplified process flow diagram for the joint production of crystalline sodium bicarbonate and sodium sulfite according to a fifth embodiment of the present invention, in which the step for producing sodium sulfite generates $CO_2$ as a byproduct using at least one decarbonation step being carried out in a crystallizer heater circulation loop which is connected to a sodium sulfite crystallizer, at least a portion of such $CO_2$ being used as a feed to the sodium bicarbonate production system. In FIG. 5 are illustrated a sodium sulfite production system 5B and the sodium bicarbonate production system 4 with gas treatment unit 40 and optional debicarbonator 60 as described previously in FIG. 3.

The sodium bicarbonate production system 5B comprises the sulfite reactor 10, an optional decarbonation unit 15, a sulfite crystallization system comprising a sulfite crystallizer 20, a circulation pump 25 and a crystallizer heater 30B, the circulation pump 25 and the crystallizer heater 30B being located in a first circulation loop 35. The first circulation loop 35 is in fluid communication at both ends with the sulfite crystallizer 20. The description of the units 10, 15, 20, and 25 and their operation are the same as previously described in relation to FIG. 4.

The system 5B differs from system 5A of FIG. 4 in that the crystallizer system in FIG. 5 is further equipped with an energy efficiency recompressing unit 70. For example, some of the sodium sulfite evaporative crystallizers may be designed for improved energy efficiency by recompressing the steam generated from the crystallizer to recover the energy for use in the crystallizer heater 30B. This is the function that the recompressing unit 70 can perform in system 5B. The recompressing unit 70 compresses, at least in part, the steam generated in the crystallizer 20 and exiting in line 22, in order for at least a portion of the recompressed steam to be directed to the crystallizer heater 30B via line 26 to recover the energy for boiling.

To that effect, the recompressing unit 70 is in fluid communication with the steam outlet of the crystallizer 20 and the steam inlet of the heater 30B. The recompressing unit 70 is adapted to compress make-up steam and the steam effluent exiting the crystallizer 20 via the crystallizer steam outlet and to direct the compressed steam to the shell side of the crystallizer heater 30B.

In the case of evaporative crystallization using vapor recompression, a technique of venting the condensing side of the crystallizer heater 30B may be used to control the accumulation of carbon dioxide within the crystallization system. The crystallizer heater 30B thus also comprises at least one additional venting outlet, which is adapted to pass excess $CO_2$ out of the heater 30B. Heater vent gas 38 passes through the venting outlet to exit heater 30B. Heater vent gas 38 can serve as a source of $CO_2$ for the sodium bicarbonate production system 4.

Indeed, the crystallizer heater 30B in the form of a shell-and-tube exchanger can be equipped with one or more vent outlets in form of nozzles on the bottom of the shell side to vent the exchanger. The flow rate of the crystallizer circulation pump 25 can be monitored to ensure sufficient venting in line 38. The circulation pump flow rate is monitored indirectly by using a flow instrument to measure the heater condensate flow rate ($F_e$) in line 31 and also by using instruments which measure the temperature on the inlet $T_1$ (e.g., in line 28) and outlet $T_2$ (e.g., in line 34) of the liquor side of the heater 30B. A circulation pump flow rate ($F_r$) in line 24 can be calculated for these readings and physical property data for the fluids.

In a typical albeit non-limiting example, the circulation flow rate ($F_r$) may be from 35,000 to 50,000 gallons per minute (GPM) or about 132,000-190,000 liters per minute (L/min). A reduced flow rate ($F_r$) below 30,000 GPM (or below 103,500 L/min) would indicate fouling in exchanger 30B or cavitation in pump 25 due to excess $CO_2$ being liberated from the crystallizer liquor. Condensate flow rates ($F_e$) of 150 GPM (or about 570 L/min) would indicate good circulation. Condensate flow rates ($F_e$) below 120 GPM (or below 454 L/min) may indicate possible pump cavitation.

In embodiments of the process according to the present invention carried in the system illustrated in FIG. 5, various $CO_2$-containing streams exit the sodium sulfite production system 5B, and any of them, individually or in combinations, may serve to form the $CO_2$-containing effluent gas 42 which is used as a $CO_2$ source in the production of sodium bicarbonate. In FIG. 5, the $CO_2$-containing effluent gas 42 may thus comprise:
  at least a portion of the reactor offgas 13 exiting reactor 10;
  at least a portion of the optionally-formed decarbonation vent gas 18 exiting optional unit 15;
  at least a portion of the heater vent gas 38 exiting heater 30B; or
  combinations of two or more of these gas streams.

Even though the gas streams 13, 18, 38 are illustrated as being combined to form a single $CO_2$ feed 42 in FIG. 5, it is to be understood that each gas stream can be separately sent to the gas treatment unit 40. It should be noted also that not all of these gas streams have to be sent to the gas treatment unit 40, if the pressure and the content in $CO_2$ and water in such gas stream are acceptable to make a suitable feed for the sodium bicarbonate production system 4.

Figure 6:
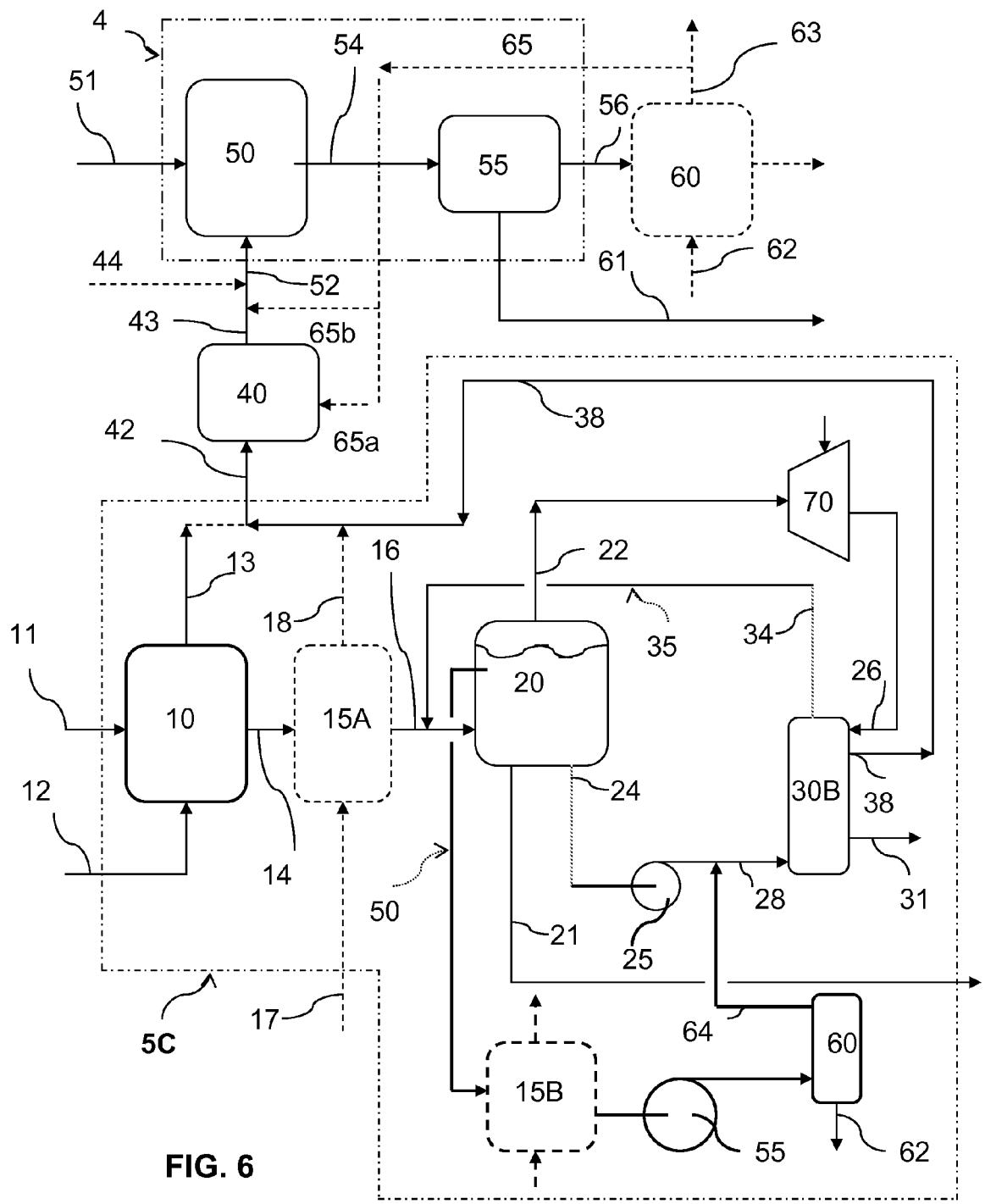
FIG. 6 illustrates a simplified process flow diagram for the joint production of crystalline sodium bicarbonate and sodium sulfite according to a sixth embodiment of the present invention, in which the step for producing sodium sulfite generates $CO_2$ as a byproduct using at least one decarbonation step being carried out in a filter circulation loop which is connected to a crystallizer, at least a portion of such $CO_2$ being used as a feed to the sodium bicarbonate production system.
Figure 7:
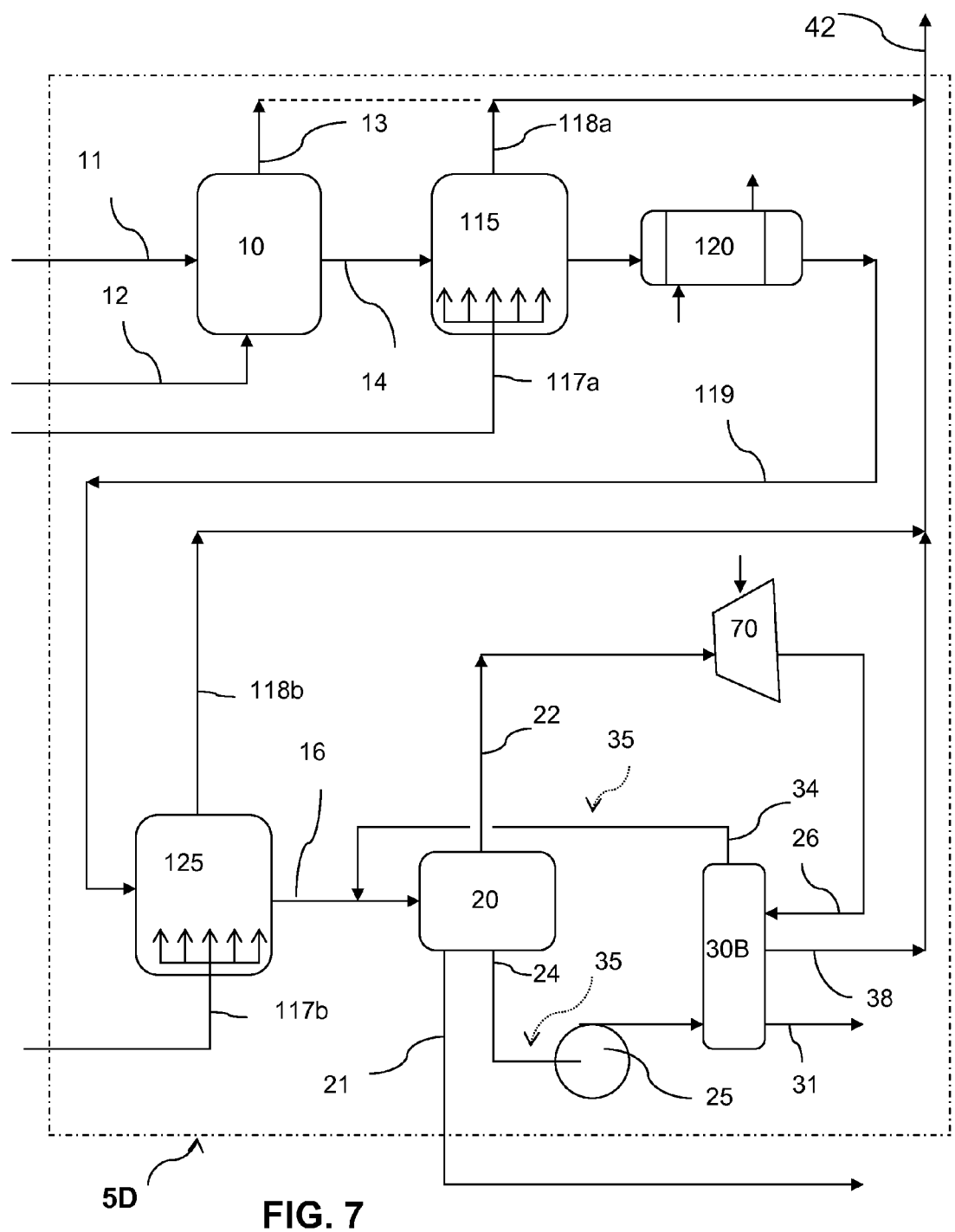
FIG. 7 illustrates a simplified process flow diagram for the production of crystalline sodium sulfite according to a seventh embodiment of the present invention, in which such process includes forming a sodium sulfite liquor and $CO_2$ as a byproduct, forming crystals of sodium sulfite in a crystallization system comprising a circulating loop, and decarbonating the sodium sulfite liquor using one or more decarbonation techniques, at least a portion of such $CO_2$ recovered in various gas effluent being used as a feed to a sodium bicarbonate production system.

FIG. 6 illustrates a simplified process flow diagram for the joint production of crystalline sodium bicarbonate and sodium sulfite according to a sixth embodiment of the present invention, in which the step for producing sodium sulfite generates $CO_2$ as a byproduct using at least one decarbonation step being carried out in a filter circulation loop which is connected to a crystallizer, at least a portion of such $CO_2$ being used as a feed to the sodium bicarbonate production system 4 such as those described in relation to FIG. 1-5. In FIG. 6 are illustrated a sodium sulfite production system 5C and the sodium bicarbonate production system 4 with gas treatment unit 40 and optional debicarbonator 60 as described previously in FIG. 3.

Similarly to FIG. 5, the sodium sulfite production system 5C comprises the sulfite reactor 10, an optional decarbonation unit 15A, the crystallization system comprising the sulfite crystallizer 20, the circulation pump 25, the crystallizer heater 30B and the recompressing unit 70, wherein the description of these units 10, 15A, 20, 30B, 35, 70 and their operation are the same as the units 10, 15 or 15A, 20, 30 or 30B, 35, 70 previously described in relation to FIG. 4 and/or FIG. 5. The crystallization system in the system 5C differs from the systems 5A and 5B in that it comprises a second circulation loop 50, also known as 'filter circulation loop'.

The filter circulation loop 50 comprises an optional decarbonation unit 15B, a (second) circulation pump 55, and a filtration unit 60, wherein the optional decarbonation unit 15B is preferably disposed upstream of the circulation pump 55.

The filtration unit 60 may comprise one or more filters operated in series or in parallel. Preferably, the filtration unit 60 comprises two or more filters. The operation of these filters may be in alternating mode. For example, a filter may be operating while the other is being changed out or cleaned. In such instances, the liquor exiting circulation pump 55 may be switched from one filter to another after a certain period of time (e.g., 24 to 36 hours). The filtration unit 60 preferably comprises two or more dead-end filters, in which insoluble material is collected. The used-up filter is drained after operation and then washed with water. The wash water containing insoluble material is then disposed of. The filtration unit 60 is preferably configured to provide a filtrate to the crystallizer heater 30B.

The operation of the filter (or second) circulation loop 50 may be facilitated by the operation of the decarbonation unit 15B, wherein any of the decarbonation techniques described above may be employed.

The optional decarbonation unit 15B is preferably in fluid communication with the sulfite crystallizer 20 and the filtration unit 60. The optional decarbonation unit 15B may be a holding vessel or a feed tank in which overflow liquor accumulates before being directed to the filtration unit 60.

The operation of the filter circulation loop 50 may be described as follows. Inside the sulfite crystallizer 20 may be disposed a "settling ring", which provides a quiet zone in which crystals settle out of the sulfite liquor. The sulfite liquor leaner in sulfite crystals then overflows out of the sulfite crystallizer 20 to the filter circulation loop 50. The sulfite liquor overflow may be directed to a filter feed holding vessel before being pumped to the filtration unit 60. The holding vessel may serve as the decarbonation unit 15B, in which case the filter feed holding vessel may be equipped with a sparger configured to inject a sparging gas (e.g., compressed air, steam or a combination of both, preferably steam), so that the sparging gas can strip $CO_2$ from the sulfite liquor. The filter feed holding vessel is also vented to remove the sparging gas carrying some $CO_2$. The sulfite liquor is then pumped from this filter feed holding vessel to one or more filters in the filtration unit 60. The filter(s) may be removing insoluble matter via line 62, such as silica and calcium compounds to reduce the insoluble concentration in the filtrate exiting each filter via line 64 to below 50 parts per millions (ppm). The filtrate exiting one or more filters is returned back to the sulfite crystallizer 20. The filtrate in line 64 may be first passed through the crystallizer heater 30B (via line 28, as shown in FIG. 6) before being returned to the sulfite crystallizer 20.

In embodiments of the process according to the present invention carried in the system illustrated in FIG. 6, various $CO_2$-containing streams exit the sodium sulfite production system 5C, and any of them, individually or in combinations, may serve to form the $CO_2$-containing effluent gas 42 which is used as a $CO_2$ source in the production of sodium bicarbonate. In FIG. 6, the $CO_2$-containing effluent gas 42 may thus comprise:

at least a portion of the reactor offgas 13 exiting reactor 10;

at least a portion of the optionally-formed vent gas 18 exiting optional decarbonation unit 15A;

at least a portion of the optionally-formed vent gas exiting an optional decarbonation unit 15B in the recirculation loop 50;

at least a portion of the heater vent gas 38 vented from heater 30B (as described in relation to FIG. 5); or combinations of two or more of these gas streams.

Even though the gas streams 13, 18, 38 are illustrated as being combined to form a single $CO_2$ feed 42 in FIG. 6, it is to be understood that each gas stream can be separately sent to the gas treatment unit 40. It should be noted also that not all of these gas streams have to be sent to the gas treatment unit 40, if the pressure and the content in $CO_2$ and water in such gas stream are acceptable to make a suitable feed for the sodium bicarbonate production system 4.

FIG. 7 illustrates a simplified process flow diagram for the production of crystalline sodium sulfite in a sodium sulfite production system 5D according to a seventh embodiment of the present invention, in which such process includes forming a sodium sulfite liquor and $CO_2$ as a byproduct, forming crystals of sodium sulfite in a crystallization system, and decarbonating the sodium sulfite liquor using a plurality of decarbonation techniques, wherein the crystallization system comprises a circulating loop 35. In FIG. 5 is illustrated a sodium sulfite production system 5D. The sodium bicarbonate production system 4 with gas treatment unit 40 and optional debicarbonator 60 described previously in relation to FIG. 1-6 are not illustrated in FIG. 7. However it should be understood that $CO_2$-containing effluent(s) exiting the sodium sulfite production system 5D may serve as feed source(s) to the sodium bicarbonate production system 4 and may be treated in gas treatment unit 40 as explained earlier before being introduced in the sodium bicarbonate production system 4.

Similarly to FIG. 5, the system 5D for carrying out the manufacture of a crystalline sodium sulfite product comprises sulfite reactor 10 and sulfite crystallization system comprising sulfite crystallizer 20, circulation pump 25, crystallizer heater 30B and recompressing unit 70, wherein the description of these units 10, 20, 30B, 35, 70 and their operation are the same as the units 10, 20, 30 and/or 30B, 35, 70 previously described in relation to FIGS. 4 and/or 5. The system 5D also comprises a feed tank 115, a liquor pre-heater 120, and a surge tank 125, each of which may be operated as one or more decarbonation units as described in FIGS. 4-6 in relation to decarbonation unit 15 or 15A.

Although not illustrated, the sulfite crystallization system may further comprise a filter (or second) circulation loop 50 which may comprise an optional decarbonation unit 15A as previously described in FIG. 6.

Referring again to FIG. 7, the operation of system 5D will now be described for the manufacture of crystalline sodium sulfite.

In a brief overview, a source 11 of sodium carbonate with a source 12 of sulfur dioxide are fed to the sulfite reactor 10 under conditions suitable to produce sodium sulfite with carbon dioxide as a by-product and generate a sodium sulfite liquor 14 which exits the sulfite reactor 10.

The reactor liquor 14 is directed to a crystallizer feed tank 115 at a flow rate from 45,000 pounds per hour (lb/hr) to 80,000 lb/hr, or from 20,400 kilograms per hour (kg/hr) to 36,300 kg/hr. The transfer of the reactor liquor 14 to tank 115 may be made by overflow or by pump.

A stripping gas 117a (e.g., steam ranging in pressure between 25 and 75 psig (about 274-618 kPa); or at about 35 psig (about 343 kPa); air ranging in pressure between 60 and 120 psig (about 515-930 kPa); or at about 100 psig (about 791 kPa); or mixtures thereof, preferably steam) is injected into the feed tank 115 and sparged through the liquor contained herein, so that carbon dioxide and unreacted $SO_2$ are vented out and exit the feed tank 115 via line 118a.

The feed tank 115 may be equipped with a (first) gas distribution system (e.g., nozzle) configured to deliver the stripping gas into the liquor disposed inside the tank 115. The (first) gas distribution system is generally disposed below the level of the liquor in the tank 115. A source of the (first) stripping gas is fed via line 117a into the tank 115 through the gas distribution system forcing the gas upward through the liquor to finally exit the tank 115 via line 118a. The stripping gas displaces some of the carbon dioxide from the liquor and carries it out of the tank 115. For example, steam (e.g., at 35 psig or 343 kPa) or air (e.g., at 100 psig or 791 kPa pressure) may be fed into the tank 115 through a plurality of nozzles or through a sparger forcing the steam or air through the liquor until it exits the tank 115 via line 118a carrying with it the displaced $CO_2$. The feed tank 115 is generally equipped with a vent that allows the stripping gas and the liberated carbon dioxide to exit the tank to generate decarbonation gas vent 118a.

When the stripping gas 117a comprises steam, the condensing steam further heats up the liquor, thus reducing the solubility of carbon dioxide, and liberates more $CO_2$. As non-limiting examples, when steam is used as the stripping gas 117a, the flow rate of steam may range from 250 lb/hr and 750 lb/hr (or from 113 kg/hr to 340 kg/hr) to effect an increase in sodium sulfite solution temperature by at least 5° F. (or 2.8° C.); or if a flow rate of about 500 lb/hr of steam (or 227 kg/hr) is used, there is an increase in the sodium sulfite solution temperature of about 10° F. (or 5.6° C.). The increase in liquor temperature in unit 115 is being measured using as the basis, the temperature of the liquor in line 114 exiting reactor 10. Optionally, a stream of air or a gas stream comprising a mixture of air and steam may also be sparged into the feed tank 115.

The sodium sulfite liquor exiting tank 115 is then directed, e.g., pumped via a pump (not illustrated), through a feed pre-heater 120 to increase the liquor temperature by at least 5° F. (or by at least 2.8° C.), or between about 15° F. to 30° F. (or from 8.3 to 16.7° C.) to further reduce the solubility of $CO_2$. The increase in liquor temperature in pre-heater 120 is being measured using as a basis, the temperature of the liquor exiting tank 115. With the use of higher liquor flow rates, there is a lower heat transfer rate and thus there is a lower increase in temperature of the sodium sulfite liquor. The pre-heated sodium sulfite liquor exiting the feed pre-heater 120 may have a temperature between 145° F. and 175° F. (or between 62.8 and 79.4° C.).

The liquor pre-heater 120 is effective in heating up the liquor by at least 5° F. (or by at least 2.8° C.), preferably approximately from 15° F. up to 30° F. (or from 8.3 to 16.7° C.) at lower feed flow rates. The increase in liquor temperature further reduces the carbon dioxide solubility and displaces the carbon dioxide out of solution thus liberating additional gaseous carbon dioxide. Any heat transfer medium can be used in the feed pre-heater 120. A preferred heat transfer medium is steam or any hot fluid which has a temperature greater, preferably at least 5° F. greater (or at least 2.8° C. greater) than the liquor entering the feed pre-heater 120.

The pre-heated sodium sulfite liquor exiting the liquor pre-heater 120 may then be fed to the crystallizer feed surge tank 125. An additional stripping gas 117b may be sparged into the sodium sulfite liquor disposed in tank 125. A source of the stripping gas 117b may be the same or different than the stripping gas 117a which may be used in the feed tank 115. The stripping gas 117b may comprise steam ranging in pressure between 25 and 75 psig (about 274-618 kPa); or at about 35 psig (about 343 kPa); or may comprise air ranging in pressure between 60 and 120 psig (about 515-930 kPa); or at about 100 psig (about 791 kPa); or any mixtures thereof. Additional liberated gaseous $CO_2$ may be vented out of the feed surge tank 125 via line 118b.

The feed surge tank 125 may be equipped with a gas inlet and with a (second) gas distribution system (e.g., nozzle(s), sparger) which is connected to the gas inlet. The (second) gas distribution system may be configured to inject the additional (or second) stripping gas into the liquor disposed inside the surge tank 125, and is generally disposed below the level of the liquor in the tank 125. The (second) stripping gas is preferably fed via line 117b into the surge tank 125 through the (second) gas distribution system forcing the gas upward through the liquor to finally exit the tank 125 via line 118b. The stripping gas displaces some of the carbon dioxide from the liquor inside surge tank 125 and carries it out of the surge tank 125. The (second) gas distribution system provides a more efficient distribution of the stripping gas in order to improve its effectiveness in displacing the $CO_2$ out of the liquor. As a non-limiting example, steam (e.g., at 35 psig or 343 kPa) or air (e.g., at 100 psig or 791 kPa) may be fed into the surge tank 125 through a plurality of nozzles or a sparger forcing the steam or air through the liquor until it exits the surge tank 125 via line 118b carrying with it the displaced $CO_2$. The surge tank 125 is generally equipped with a gas vent that allows the (second) stripping gas and the liberated carbon dioxide to exit the tank.

Additionally or alternatively, the (second) stripping gas may be added to a transfer pipe (e.g., line 119) in fluid relation with the liquor inlet of the crystallizer feed surge tank 125. For example, about 100 scfm (or 2,832 standard liters per minute) of compressed air at 100 psig (or about 791 kPa) may be added into the transfer piping at the liquor inlet to the crystallizer feed surge tank 125 to provide additional stripping.

When the feed surge tank 125 comprises fiberglass walls, which have a 180° F. (82.2° C.) temperature limit, there may be some heat loss through the fiberglass tank walls, which in turn may cause the temperature of the liquor stored herein to decrease by about 5° F. (or by 2.8° C.). Optionally, when the feed surge tank 125 is an insulated steel walled tank, the sodium sulfite liquor in the feed surge tank 125 could be maintained as high as 190° F. (87.8° C.).

The feed liquor 16 which has been subjected to one or more decarbonation steps in feed tank 115, in feed pre-heater 120 and in surge tank 125 is then directed to the sulfite crystallizer 20 where water from the liquor is evaporated to produce sodium sulfite crystals. The decarbonated sodium sulfite liquor 16 may be pumped via a pump (not illustrated) to the sulfite crystallizer 20. The sodium sulfite crystals formed in crystallizer 20 are removed from the crystallizer via crystal slurry 21 and are dried, typically in a rotary dryer (not shown).

A hot gas (e.g., steam, air, nitrogen or mixtures of two or more thereof) may optionally be sparged into a crystallizer filter loop liquor (not shown) for example, at the crystallizer exit, such as described earlier in FIG. 6 in the context of the decarbonation unit 15B disposed in the second circulation loop 50.

Optionally, the sodium sulfite liquor passing through any piping between the liquor outlet of sulfite reactor 110 and the liquor inlet of sulfite crystallizer 20 may be flashed using an expander, a barometric condenser, a venturi, a spray nozzle, or other vacuum source to release additional $CO_2$.

In embodiments of the process according to the present invention carried in the system illustrated in FIG. 7, various $CO_2$-containing streams exit the sodium sulfite production system 5D, and any of them, individually or in combinations, may serve to form the $CO_2$-containing effluent gas 42 which is used as a $CO_2$ source in the production of sodium bicarbonate. Although illustrated in FIG. 7, it should be understood that such gas effluent 42 may be directed to the gas treatment unit 40 to form a treated gas effluent 43 which then may serve, at least in part, as a feed source for $CO_2$ feed 52 for the sodium bicarbonate system 4 as described and shown in relation to FIG. 1-6.

In FIG. 7, the $CO_2$-containing effluent gas 42 may thus comprise:
at least a portion of the reactor offgas 13 exiting reactor 10;
at least a portion of the first decarbonation vent gas 118a exiting tank 115;
at least a portion of the second decarbonation vent gas 118b exiting tank 125;
at least a portion of the heater vent gas 38 vented from heater 30B;
at least a portion of a optionally-formed vent gas exiting an optional decarbonation unit 15B in a second recirculation loop 50 (described in relation to FIG. 6 but not illustrated in FIG. 7); or
combinations of two or more of these gas streams.

Even though the gas streams 13, 118a, 118b, 38 are illustrated as being combined to form a single $CO_2$-containing effluent gas 42 in FIG. 7, it is to be understood that each gas stream can be separately sent to a gas treatment unit 40 (not illustrated in FIG. 7). It should be noted also that not all of these gas streams have to be sent to such gas treatment unit, if the pressure and the content in $CO_2$ and in water in such gas stream are acceptable to make a suitable feed for a sodium bicarbonate production system.

Additional embodiments for decarbonation of sulfite liquor in a sulfite crystallization system may be found in U.S. Pat. No. 8,366,793 entitled 'Method for decarbonation and its use in producing crystalline sodium sulfite or other alkali products" (Solvay Chemicals, Inc.) and are incorporated herein by reference in the present application.

It should be understood that any description, even though described in relation to a specific embodiment or drawing, is applicable to and interchangeable with other embodiments of the present invention.

The discussion of a reference in the Background is not an admission that it is prior art to the present invention, especially any reference that may have a publication date after the priority date of this application.

Numeric ranges recited herein are inclusive of the numbers defining the range and include and are supportive of each integer within the defined range.

The section headings used herein are for organizational purposes only and are not to be construed as limiting the subject matter described.

All documents, or portions of documents, cited in this application, including but not limited to patents, patent applications, articles, books, and treatises, are hereby expressly incorporated by reference in their entirety for any purpose, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

Each and every claim is incorporated into the specification as an embodiment of the present invention. Thus, the claims are a further description and are an addition to the preferred embodiments of the present invention.

Accordingly, the scope of protection is not limited by the description set out above, but is only limited by the claims which follow, that scope including all equivalents of the subject matter of the claims.

What we claim is:

1. A process for co-production of crystalline sodium bicarbonate and another crystalline alkali product, said process comprising:
   A/ forming the other crystalline alkali product in an alkali production system from which a gas effluent comprising carbon dioxide ($CO_2$) exits;
   B/ treating at least a portion of said gas effluent comprising $CO_2$ to form a treated gas effluent comprising $CO_2$; and
   C/ reacting at least a portion of said $CO_2$ from said treated gas effluent with sodium carbonate under conversion promoting conditions to produce an aqueous suspension comprising sodium bicarbonate crystals,
   wherein treating in step B/ comprises compressing at least a portion of said gas effluent comprising $CO_2$ to increase its pressure; or
   wherein, when said gas effluent comprising $CO_2$ comprises water, treating in step B/ comprises removing water from at least a portion of said gas effluent in order for said treated as effluent comprising $CO_2$ to comprise at most 7 vol. % water.

2. The process according to claim 1, wherein at least a portion of said gas effluent comprising carbon dioxide ($CO_2$) exiting from said alkali production system is generated in step A/ by decarbonating a liquor comprising carbon dioxide ($CO_2$) and said other alkali product in a vessel to form a decarbonated liquor, said decarbonated liquor being used to form crystals of said other alkali product.

3. The process according to claim 1, wherein the other alkali product is an alkali metal sulfite.

4. The process according to claim 3, wherein said alkali production system in step A/ comprises an alkali metal sulfite crystallization system, said alkali metal sulfite crystallization system comprising a sulfite crystallizer, a crystallizer heater in a first circulation loop connected to said sulfite crystallizer, and optionally a filter in an optional second circulation loop connected to said sulfite crystallizer or said crystallizer heater, and wherein the process further comprises:

reacting $SO_2$ as one reactant and a carbonate compound as another reactant, under conversion promoting conditions in a sulfite reactor to form the alkali metal sulfite product and $CO_2$ to generate a sulfite liquor comprising said alkali metal sulfite and at least a portion of the formed $CO_2$, said sulfite liquor having a temperature and a pressure when exiting said reactor; and performing at least one decarbonation technique selected from the group consisting of:

a) passing a stripping gas through said sulfite liquor or a portion thereof to remove at least a portion of said $CO_2$ in order to decrease the $CO_2$ content of said sulfite liquor, so as to form a decarbonated sulfite liquor and a decarbonation gas comprising $CO_2$, wherein said stripping gas excludes sulfur dioxide, said step (a) being carried out prior to loading said sulfite liquor into said sulfite crystallizer, or while passing said sulfite liquor through said first circulation loop, through said optional second circulation loop, or through both;

b) increasing the temperature of said sulfite liquor by 5° F. or more, said step (b) being carried out prior to loading said sulfite liquor into said sulfite crystallizer, or while passing said sulfite liquor through said first circulation loop, through said optional second circulation loop, or through both;

c) decreasing the pressure of said sulfite liquor, said step (c) being carried out prior to loading said sulfite liquor into said metal sulfite crystallizer, or while passing said sulfite liquor through said first circulation loop, through said optional second circulation loop, or through both;

d) venting a condensing side of said crystallizer heater, while passing said sulfite liquor through said first circulation loop; and e) any combination of two or more of these techniques.

5. The method according to claim 4, wherein said stripping gas in step (a) comprises steam, air or mixtures thereof.

6. The method according to claim 4, wherein the step (b) is carried out to increase the sulfite liquor temperature to a temperature not exceeding the saturation point of said alkali metal sulfite in water.

7. The process according to claim 1, wherein the other alkali product is sodium sulfite.

8. The process according to claim 7, wherein said alkali production system in step A/ comprises a sodium sulfite crystallization system, said sodium sulfite crystallization system comprising a sulfite evaporative crystallizer, a crystallizer heater in a first circulation loop connected to said sulfite crystallizer, and optionally a filter in a second circulation loop connected to said sulfite crystallizer or said crystallizer heater, and wherein said forming the crystalline sodium sulfite product comprises the following steps:

reacting an aqueous solution comprising sodium carbonate with sulfur dioxide in a sodium sulfite reactor under conversion promoting conditions to form a sodium sulfite liquor comprising $CO_2$ and sodium sulfite, and optionally further to form a reactor gas effluent comprising $CO_2$;

introducing the sodium sulfite liquor into a sodium sulfite feed tank;

feeding said sodium sulfite liquor to the sodium sulfite evaporative crystallizer;

circulating said sodium sulfite liquor through said sodium sulfite crystallizer heater in said crystallizer circulation loop;

performing at least one decarbonation technique on at least a portion of said sodium sulfite liquor to become a decarbonated liquor and to form a decarbonation gas stream comprising $CO_2$;

forming sodium sulfite crystals from said decarbonated sodium sulfite liquor into said sulfite evaporative crystallizer; and removing said sodium sulfite crystals from said sulfite evaporative crystallizer, wherein said gas effluent comprising carbon dioxide ($CO_2$) exiting said sodium sulfite production system comprises said decarbonation gas stream comprising $CO_2$, said optionally-generated reactor gas effluent comprising $CO_2$, or any combinations thereof.

9. The process according to claim 8, wherein the decarbonation technique is selected from the group consisting of:

a) introducing a stripping gas into the sodium sulfite liquor in the feed tank, and venting carbon dioxide from the feed tank, wherein said stripping gas in step (a) comprises steam, air or mixtures thereof;

b) heating said sodium sulfite liquor;

c) decreasing the pressure of said sodium sulfite liquor;

d) venting a condensing side of said sulfite crystallizer heater, while passing said sodium sulfite liquor through said crystallizer circulation loop; and e) any combination of two or more of these techniques.

10. The process according to claim 9, wherein the aqueous solution comprising sodium carbonate used to make said sodium sulfite liquor comprises:

an aqueous solution into which trona ore is dissolved;
an aqueous solution into which calcined trona is dissolved;
an aqueous solution into which soda ash is dissolved; or
any combinations thereof.

11. The process according to claim 1, wherein said gas effluent comprising $CO_2$ exiting said alkali production system comprises water; wherein treating in step B/ comprises removing water from at least a portion of said gas effluent in order for said treated gas effluent comprising $CO_2$ to comprise at most 7 vol. % water; and wherein said water removal in said step B/ comprises:

cooling at least a portion of said gas effluent to condense water;

passing at least a portion of the gas effluent through a desiccant drying unit;

passing at least a portion of said gas effluent through a glycol dehydration unit; or any combinations thereof.

12. The process according to claim 1, wherein treating in step B/ comprises compressing at least a portion of said gas effluent to increase its pressure; and wherein said gas effluent comprises a water content which exceeds a maximum allowable water content suitable for compression, and wherein treating in step B/ further comprises, before said compressing step, removing water from the portion of said gas effluent which is to be compressed to form a partially-treated gas effluent, said partially-treated gas effluent having a water content equal to or less than said maximum allowable water content suitable for compression.

13. The process according to claim 1, wherein treating in step B/ comprises removing water from at least a portion of said gas effluent to achieve at most 7 vol. % water in a partially-treated gas effluent and then compressing at least a portion of said partially-treated gas effluent to increase its pressure before step C/ is carried out.

14. The process according to claim 1, wherein said treated gas effluent comprising $CO_2$ comprises at least 90 vol. % $CO_2$.

15. The process according to claim 1, wherein step C/ to form sodium bicarbonate takes place in a sodium bicarbonate reactor, wherein step C/ comprises feeding a sodium carbonate-containing solution or stream to the sodium bicarbonate reactor, the solution or stream comprising at least 15 wt % of sodium carbonate, said sodium carbonate-containing solution or stream comprising:
- an aqueous solution or stream into which trona ore is dissolved;
- an aqueous solution or stream into which calcined trona is dissolved;
- an aqueous solution or stream into which soda ash is dissolved;
- an aqueous solution or stream into which an evaporative pond sodium carbonate decahydrate deposit is dissolved;
- an evaporative pond bittern aqueous solution or stream;
- a recycle stream from a sodium carbonate monohydrate, sodium carbonate decahydrate, or sodium sesquicarbonate crystallizer;
- a purge stream from a sodium carbonate monohydrate, sodium carbonate decahydrate, or sodium sesquicarbonate crystallizer;
- a mine water solution or stream; or
- any combination of two or more thereof.

16. A process for co-production of crystalline sodium bicarbonate and another alkali product, wherein said other alkali product is a crystalline sulfite salt,
said process comprising:
- A/ forming the crystalline sulfite salt in a sulfite salt production system from which a gas effluent comprising carbon dioxide ($CO_2$) exits;
- B/ treating at least a portion of said gas effluent comprising $CO_2$ to form a treated gas effluent comprising $CO_2$; and
- C/ reacting at least a portion of said $CO_2$ from said treated gas effluent with sodium carbonate under conversion promoting conditions to produce an aqueous suspension comprising sodium bicarbonate crystals, and wherein said step A/ comprises collecting at least one $CO_2$-containing effluent gas stream exiting the sulfite salt production system selected from the group consisting of:
  - at least a portion of a reactor offgas exiting a sulfite reactor;
  - at least a portion of one or more decarbonation vent gases exiting one or more decarbonation units located downstream of a sulfite crystallizer and upstream of a sulfite crystallizer;
  - at least a portion of a vent gas exiting a surge or feed tank;
  - at least a portion of a heater vent gas vented from a crystallizer heater which is connected to a sulfite crystallizer in a heater circulation loop;
  - at least a portion of a heater vent gas vented from a crystallizer heater recirculation loop; and
  - any combination of two or more thereof.

17. The process according to claim 16, wherein treating in step B/ comprises
- removing water from at least a portion of said gas effluent comprising $CO_2$ exiting the sulfite production system, or
- compressing at least a portion of said gas effluent exiting the sulfite production system to increase its pressure.

18. The process according to claim 16, wherein treating in step B/ comprises a two-step process:
- 1/ removing water from the gas effluent comprising $CO_2$ exiting the sulfite production system to form a partially-treated gas effluent containing at most 1 vol. % water, and then
- 2/ compressing said partially-treated gas effluent to increase its pressure to form the treated gas effluent with a higher pressure and containing at most 1 vol. % water.

19. The process according to claim 16, wherein the other alkali product is sodium sulfite.

20. The process according to claim 16, wherein said treated gas effluent comprising $CO_2$ comprises at least 90 vol. % $CO_2$.

* * * * *